United States Patent
Akatsuka et al.

(10) Patent No.: US 6,697,761 B2
(45) Date of Patent: Feb. 24, 2004

(54) THREE-DIMENSIONAL POSITION/ORIENTATION SENSING APPARATUS, INFORMATION PRESENTING SYSTEM, AND MODEL ERROR DETECTING SYSTEM

(75) Inventors: Yuichiro Akatsuka, Tama (JP); Akito Saito, Hino (JP); Takao Shibasaki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 113 days.

(21) Appl. No.: 09/951,873

(22) Filed: Sep. 13, 2001

(65) Prior Publication Data

US 2002/0052709 A1 May 2, 2002

(30) Foreign Application Priority Data

Sep. 19, 2000 (JP) .......................................... 2000-283292
Sep. 19, 2000 (JP) .......................................... 2000-284318

(51) Int. Cl.⁷ ................................................ G06F 9/00
(52) U.S. Cl. ...................... 702/151; 702/150; 702/152; 702/153
(58) Field of Search .................. 702/150, 151, 702/152, 153; 396/70, 429; 714/48, 56, 57

(56) References Cited

U.S. PATENT DOCUMENTS 5,671,160 A * 9/1997 Julian ........................... 702/94
6,339,683 B1 * 1/2002 Nakayama et al. .......... 396/429
6,405,072 B1 * 6/2002 Cosman ....................... 600/426

FOREIGN PATENT DOCUMENTS

JP  7-56624   3/1995
JP  10-267671  10/1998

OTHER PUBLICATIONS

Akira Takahashi, Ikuo Ishii, Hideo Makino and Makoto Nakashizuka, "A High Accuracy Realtime 3D Measuring Method of Marker for VR Interface by Monocular Vision", 3D Image Conference, 1996 (Japan), p.p. 167–172.

* cited by examiner

Primary Examiner—Marc S. Hoff
Assistant Examiner—Felix Suarez
(74) Attorney, Agent, or Firm—Frishauf, Holtz, Goodman & Chick, P.C.

(57) ABSTRACT

There are disclosed a three-dimensional position/orientation sensing apparatus which can measure a broad region, when an image obtained by capturing a marker having a known position/orientation relation with an object is analyzed, a relative position/orientation relation between the marker and a capturing apparatus is obtained, and a position and orientation of the object are obtained, an information presenting system in which the captured image of an actual object can easily be compared with object data, and a model error detecting system.

45 Claims, 18 Drawing Sheets

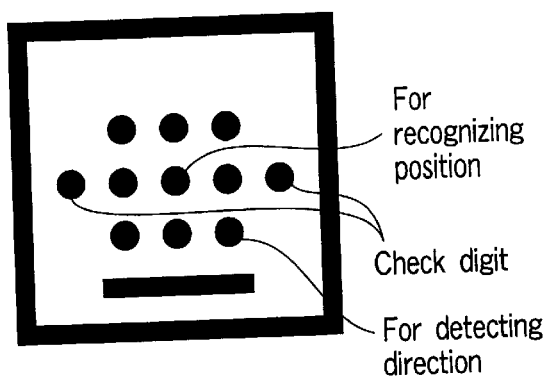
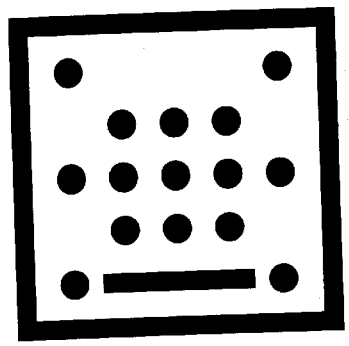
FIG. 4A  FIG. 4B
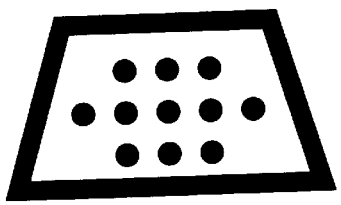
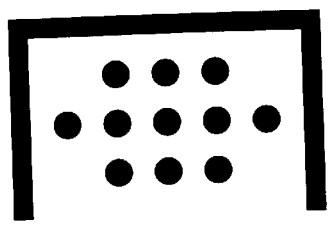
FIG. 4C  FIG. 4D
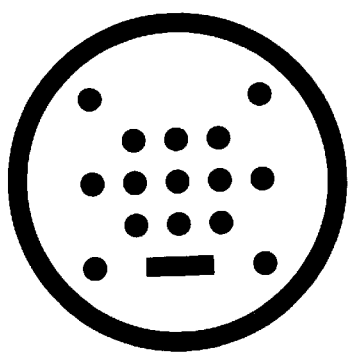
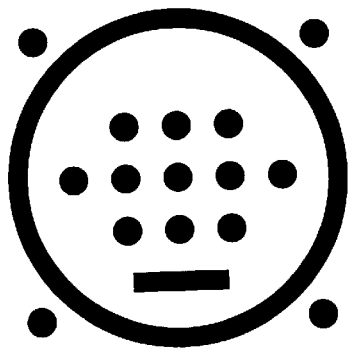
FIG. 4E  FIG. 4F
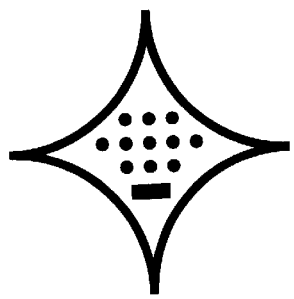
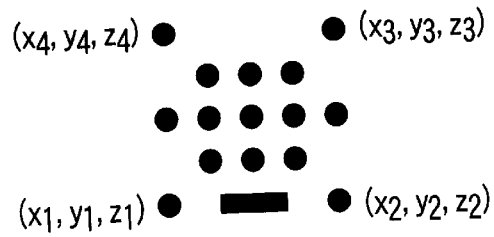
FIG. 4G  FIG. 4H

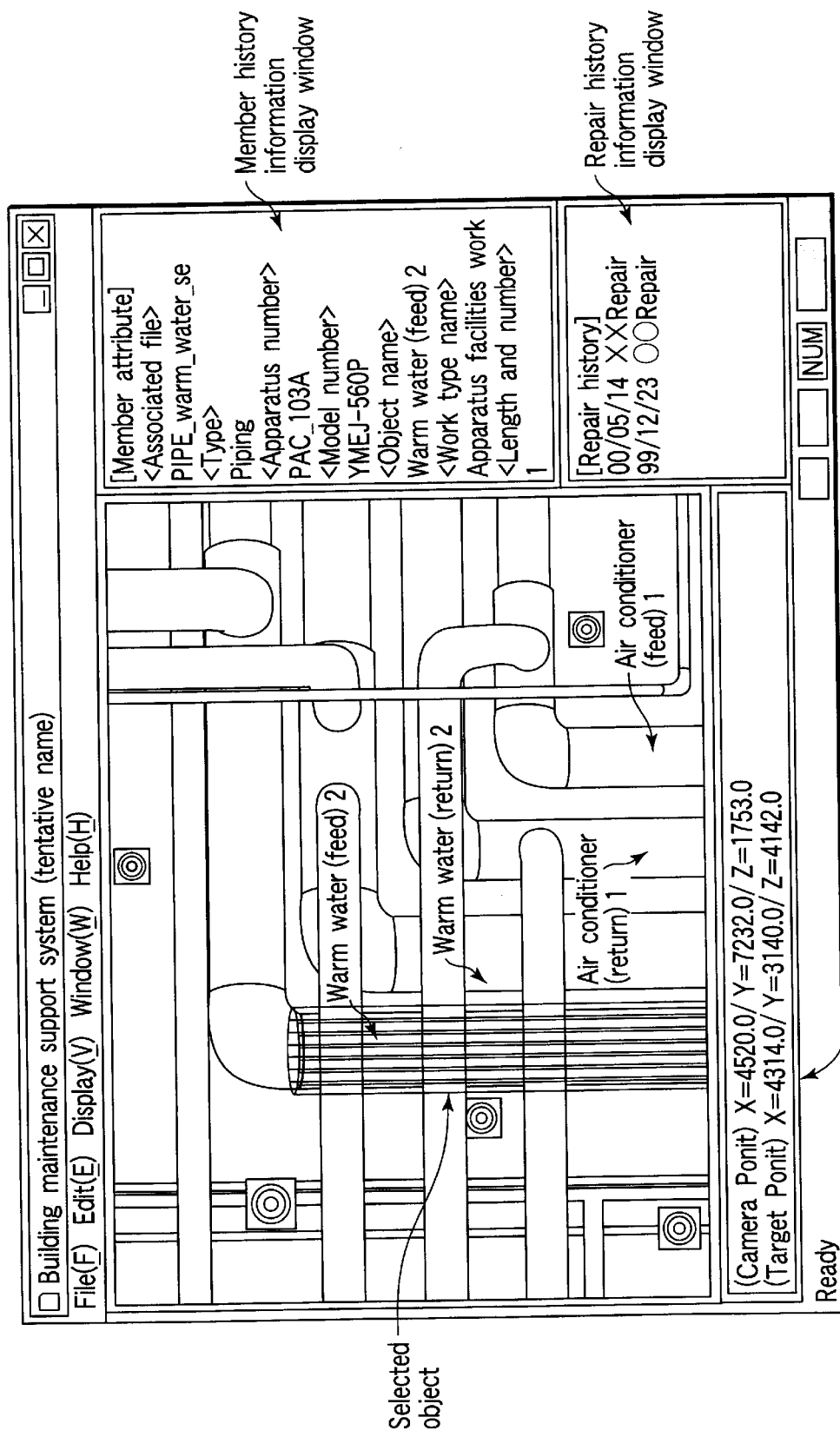
F I G. 13

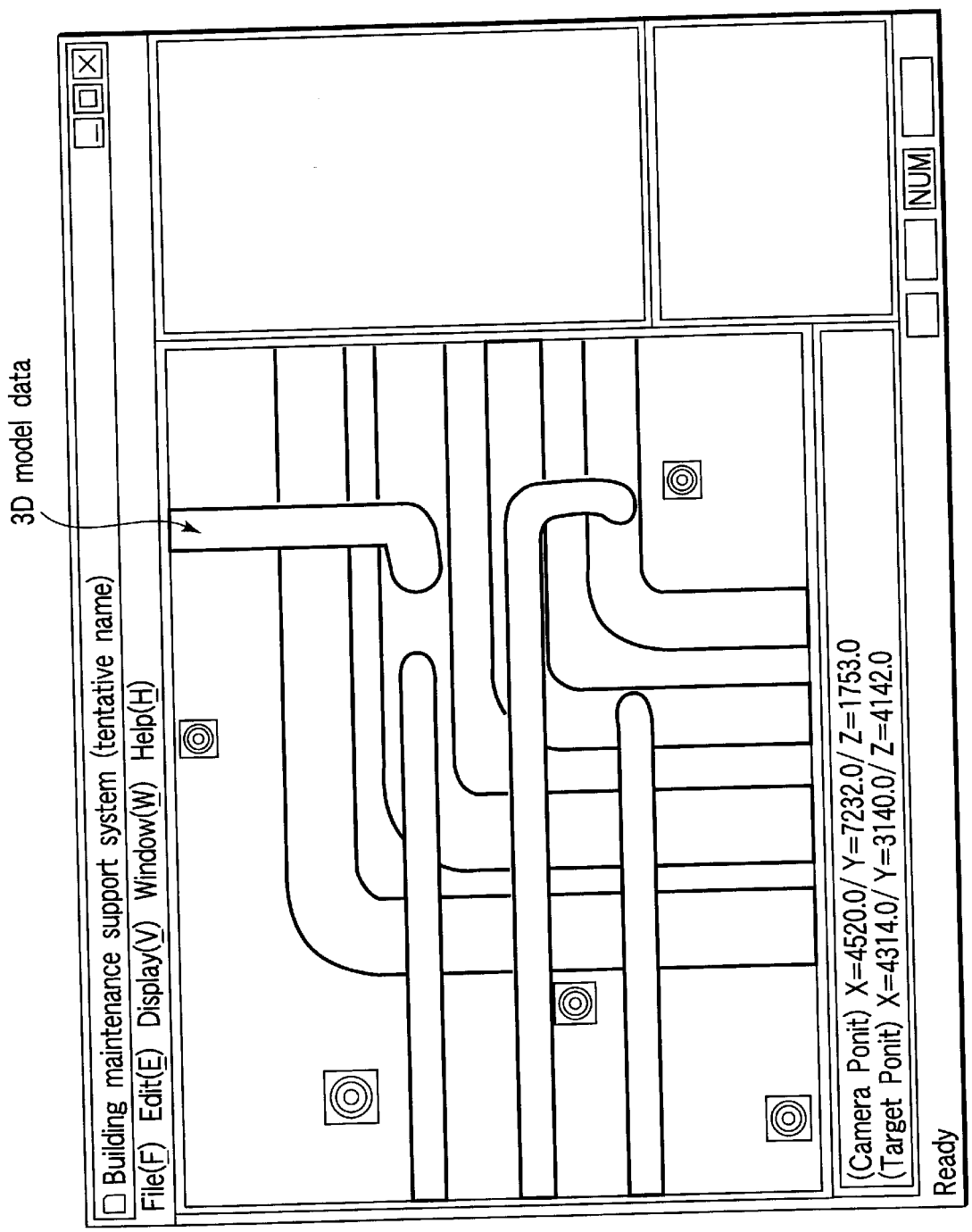
F I G. 19

THREE-DIMENSIONAL POSITION/ORIENTATION SENSING APPARATUS, INFORMATION PRESENTING SYSTEM, AND MODEL ERROR DETECTING SYSTEM

CROSS-REFERENCE TO RELATED APPLICATIONS

This application is based upon and claims the benefit of priority from the prior Japanese Patent Applications No. 2000-283292, filed Sep. 19, 2000; and No. 2000-284318, filed Sep. 19, 2000, the entire contents of both of which are incorporated herein by reference.

BACKGROUND OF THE INVENTION

1. Field of the Invention

The present invention relates to a three-dimensional position/orientation sensing apparatus for utilizing an image capturing apparatus to photograph an object and measuring a relative three-dimensional position/orientation of the object, an information presenting system, and a model error detecting system.

2. Description of the Related Art

A conventional technique has been known for analyzing an image obtained by capturing a marker as an index of a predetermined shape and obtaining a position and orientation of image input means with respect to the marker.

For example, the following technique is disclosed in "High-Density Real-Time Estimating Method of Position/Orientation of Rectangular Marker by Monocule for VR Interface" (3D Image Conference 96 Drafts, pp. 167 to 172, Akira Takahashi, Ikuo Ishii, Hideo Makino, Makoto Nakano, 1996). In the technique, a rectangular marker whose position coordinate is known beforehand is captured, and a relative position/orientation relation between the rectangular marker and a capturing camera is obtained from positions of four corners of the rectangular marker on a captured image. Moreover, the position and orientation of the capturing camera are calculated.

However, when the camera is far from the marker in the aforementioned prior art, distances among the four corners of the marker on the image are reduced, and detection precision is disadvantageously deteriorated. Therefore, a detectable range is limited.

To avoid this, a plurality of markers are arranged beforehand at a certain degree of density in a space region which is possibly captured by the camera, and the marker having a relatively short distance may be used out of the markers in a camera capturing range to obtain the relative position/orientation of the camera and marker.

However, when the plurality of markers are used in this manner, and when a simple diagram is used as in the aforementioned prior art, it is difficult to designate the marker as a reference of the relative position.

On the other hand, various techniques of superimposing and displaying information of an object in the image onto the image captured by the camera have heretofore been developed.

For example, in Jpn. Pat. Appln. KOKAI Publication No. 267671/1998, a technique having the following characteristic is disclosed. That is, a view image is taken by the camera in the technique. Subsequently, a visual field space in a map information space is obtained based on a camera position and view angle, focal length, and image size information at the time. Moreover, a structure in the visual field space is acquired. Furthermore, a name and attribute of the structure are prepared as label information. Additionally, the label information is superimposed/displayed on the view image.

Moreover, a technique having the following characteristic is disclosed in Jpn. Pat. Appln. KOKAI Publication No. 56624/1995. That is, the technique is a system for use in maintenance and repair in an operation site. In a head mounted display, an image obtained by two-dimensionally projected information of a subject present around an operator, and an actual image masked so that only a subject portion is displayed are superimposed/displayed. An output of a gyro included in the head mounted display is used in controlling the mask.

However, in these prior arts, it is necessary to take in the position and view angle of capturing means, focal length, image size information, and the like. Therefore, exact superimposition is impossible in consideration of sensor error and drift. It is also necessary to measure a capturing position so that the position is accurate to some degree, and there is a limitation. Moreover, the name, attribute, and the like are displayed on the real image, and this only assists understanding of the operator.

There is a demand for comparison/study of object data with the actual object on the image in industrial fields, particularly in a field of facilities construction and maintenance. However, the aforementioned prior arts do not satisfy this demand.

BRIEF SUMMARY OF THE INVENTION

The present invention has been developed in consideration of the aforementioned problems, and an object thereof is to provide a three-dimensional position/orientation sensing apparatus. The apparatus can measure a relatively broad region, when an image obtained by capturing a marker having a known position/orientation relation with an object is analyzed, a relative position/orientation relation between the marker and capturing means is obtained, and a position and orientation of the object are obtained. Further object is to provide an information presenting system and model error detecting system in which a captured image of an actual object can easily be compared with object data.

To achieve the object, according to a first aspect of the present invention, there is provided a three-dimensional position/orientation sensing apparatus for measuring a relative three-dimensional position/orientation relation between an object and a capturing apparatus from an image captured by the capturing apparatus, comprising: an image input section which inputs the image obtained by capturing the object and a marker having a known three-dimensional position/orientation relation by the capturing apparatus; an identifying section which uses a geometric characteristic of the marker to identify the marker in the image inputted from the image input section; and a position/orientation detecting section by a single marker, which analyzes the image of one of a plurality of markers identified by the identifying section, obtains a relative position/orientation relation between the marker and the capturing apparatus, and obtains the three-dimensional position/orientation relation between the object and the capturing apparatus.

According to a second aspect of the present invention, there is provided an information presenting system comprising: an image input section which inputs an image obtained by capturing a marker whose three-dimensional position relation with an object is known by a capturing apparatus; a position/orientation detecting section which uses a position of the marker on the image to obtain a position/orientation relation between the object and the capturing apparatus; and a display section which displays three-dimensional model data of the object on the image with a position, a size, and a direction based on the position/orientation relation.

According to a third aspect of the present invention, there is provided a model error detecting system in which three-dimensional model data of an object can be corrected based on an image of the object, the system comprising: an image input section which inputs the image obtained by capturing the object by a capturing apparatus; a position/orientation detecting section which obtains a position/orientation relation between the object and the capturing apparatus; a holding section which holds the model data of the object; an error detecting section which compares the object model data extracted from the holding section with the image of the object based on the position/orientation relation, and detects an actual error with the model data of the object; and a correcting section which corrects the model data of the holding section based on a detection result of the error detecting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a diagram showing one example of a square code marker;

FIG. 4B is a diagram showing one example of the square code marker;

FIG. 4C is a diagram showing one example of a trapezoidal code marker;

FIG. 4D is a diagram showing one example of a U-shaped code marker;

FIG. 4E is a diagram showing one example of a circular code marker;

FIG. 4F is a diagram showing another example of the circular code marker;

FIG. 4G is a diagram showing one example of a star-shaped code marker;

FIG. 4H is a diagram showing a characteristic detection result of the code marker of FIG. 4A;

FIG. 13 is an explanatory view of the annotation display mode by the information presenting system according to the fifth embodiment;

FIG. 19 is an explanatory view of the mode for comparing/displaying the finished object and the design plan by the information presenting system according to the fifth embodiment;

DETAILED DESCRIPTION OF THE INVENTION

Preferred embodiments of the present invention will be described hereinafter with reference to the drawings.

First, a first embodiment of the present invention will be described.

Figure 1:
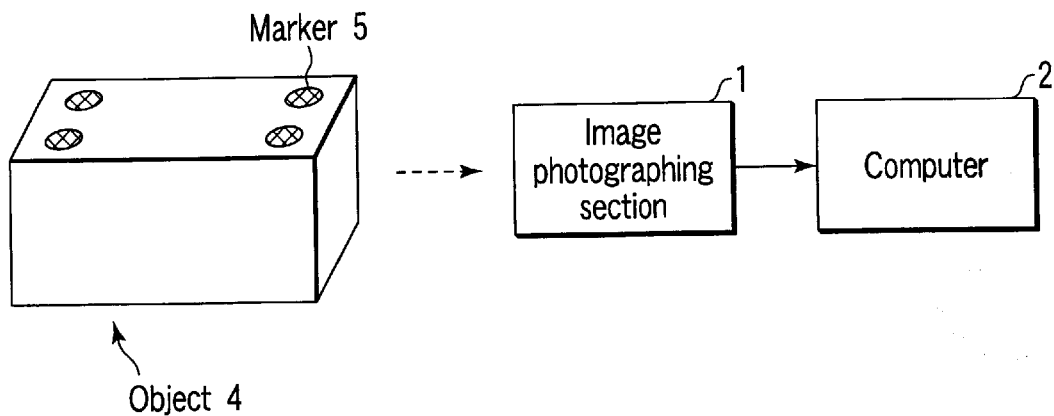
FIG. 1 is a functional block diagram showing a constitution of a three-dimensional position/orientation sensing apparatus according to a first embodiment.

FIG. 1 is a functional block diagram showing a constitution of a three-dimensional position/orientation sensing apparatus according to a first embodiment of the present invention.

As shown in FIG. 1, a plurality of inherent markers 5 (hereinafter referred to as a code marker) having geometrically inherent characteristics are disposed on or in the vicinity of an object 4 whose three-dimensional position/orientation is to be estimated.

Moreover, an image capturing section 1 photographs the code marker 5, and transfers an image of the marker to a computer 2. Examples of the image capturing section 1 include a general TV camera, a digital video camera, and the like. Moreover, examples of the computer 2 having received the image transferred from the image capturing section 1 include a usual personal computer, a special image processing operation apparatus, and the like.

When the image capturing section 1 is a TV camera, and outputs an analog signal, the computer 2 includes an apparatus or a unit for digitizing the analog signal. Moreover, when the image capturing section 1 is a digital camera, a digital video camera, or the like, the section directly transfers a digital signal to the computer 2, and the computer 2 processes the digital signal.

When the computer 2 receives the image of the code marker 5 captured by the image capturing section 1, converts the image to the digital signal, and processes the digital signal, the code marker 5 in the image is recognized. When a position of the code marker 5 in the image, and a three-dimensional position of the code marker 5 registered beforehand are utilized, a three-dimensional position/orientation of the object 4 with respect to the image capturing section 1 is estimated. The three-dimensional position of the code marker 5 is stored beforehand in a memory of the computer 2.

Figure 2:
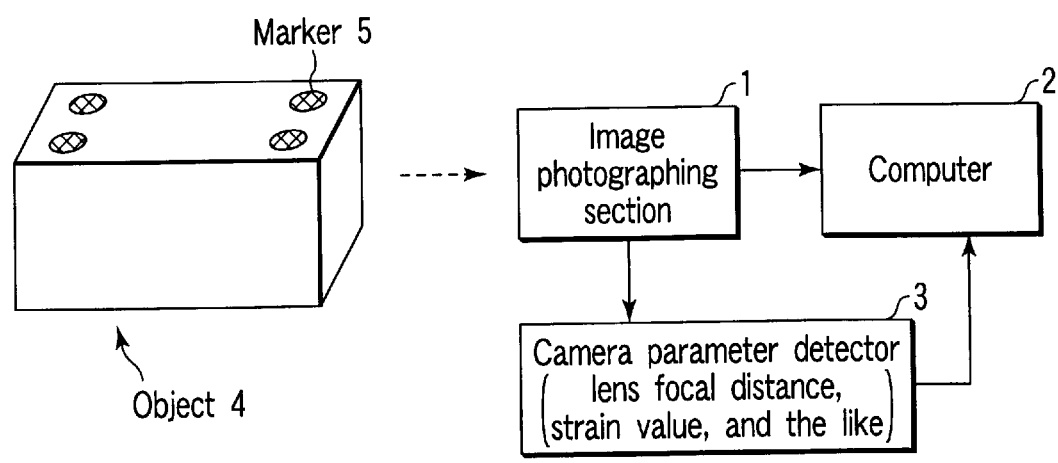
FIG. 2 is a functional block diagram showing a constitution of a modification example of the three-dimensional position/orientation sensing apparatus according to the first embodiment.

Furthermore, when a camera parameter detector 3 is incorporated in the constitution as shown in FIG. 2, the camera parameter detector 3 transfers information such as a lens focal length and strain value of a camera as the image capturing section 1 to the computer 2, and the computer 2 takes the information into consideration to estimate the three-dimensional position/orientation.

First, a method of estimating a position/orientation of the object 4 will be described in a case in which at least three code markers 5 can be identified.

Basic handling of an image and coordinate conversion will be described hereinafter.

The object 4 and image capturing section 1 basically have respective inherent coordinate systems, and the image captured by the image capturing section 1 is defined as a camera image plane.

Figure 3:
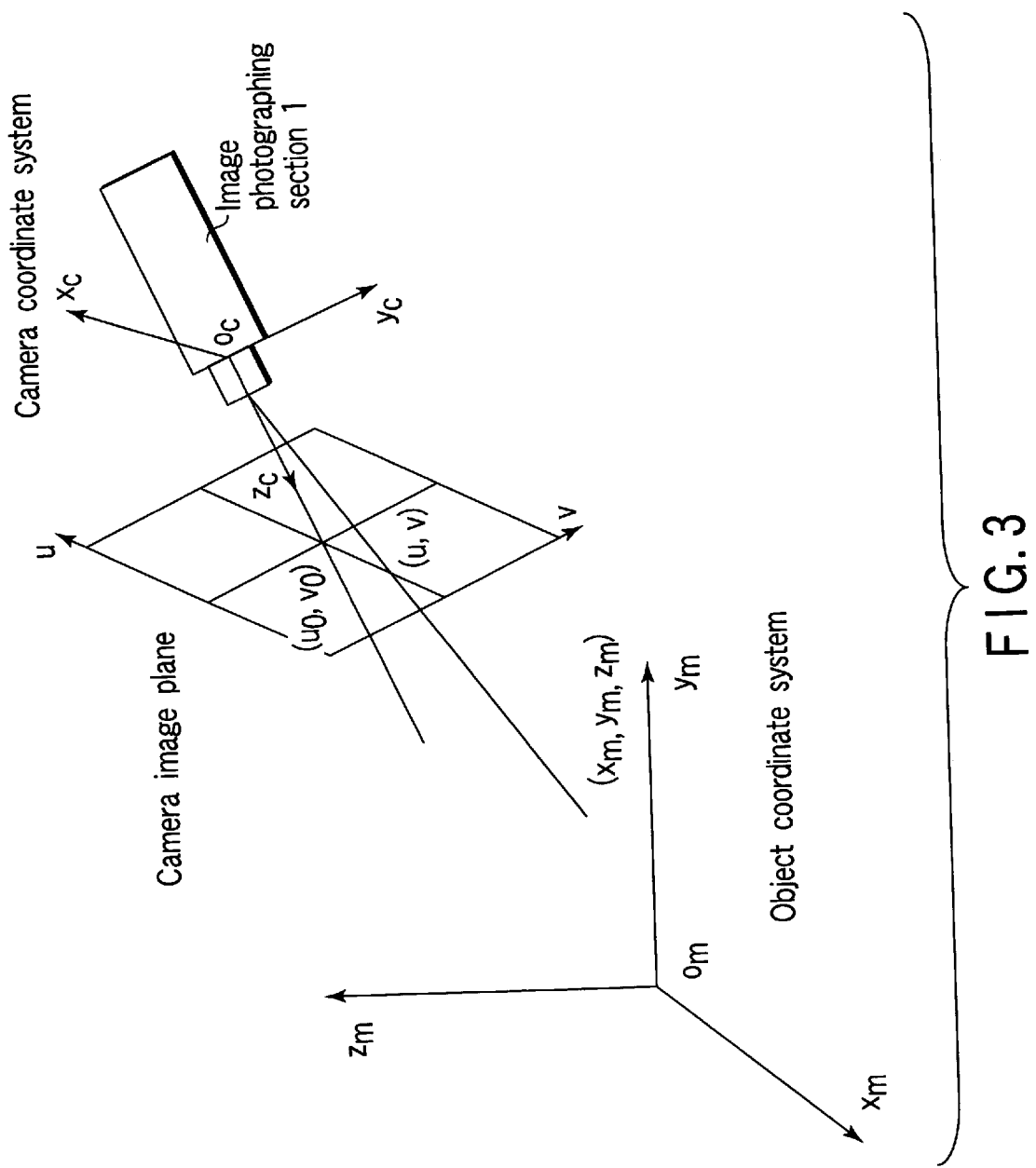
FIG. 3 is a diagram showing a relation among a camera image plane, a camera coordinate system of an image capturing section, and an object coordinate system.
Figure 5A:
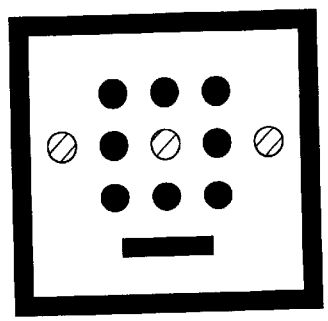
FIG. 5A is a diagram showing one example of a circular code.
Figure 5B:
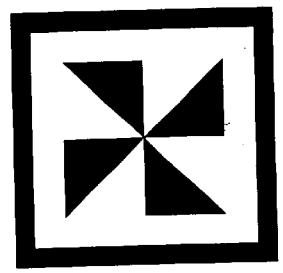
FIG. 5B is a diagram showing one example of a triangular code.
Figure 5C:
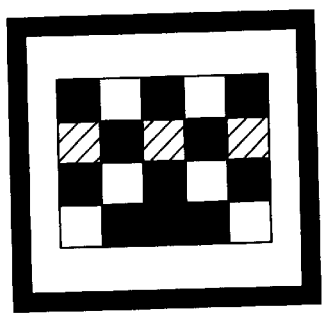
FIG. 5C is a diagram showing one example of a quadrangular code.
Figure 5D:
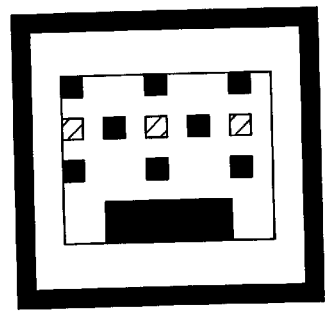
FIG. 5D is a diagram showing another example of the quadrangular code.
Figure 5E:
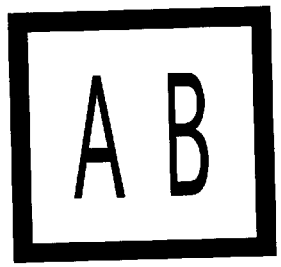
FIG. 5E is a diagram showing one example of a character code.
Figure 5F:
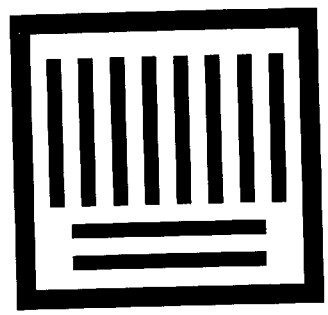
FIG. 5F is a diagram showing one example of a linear code.
Figure 5G:
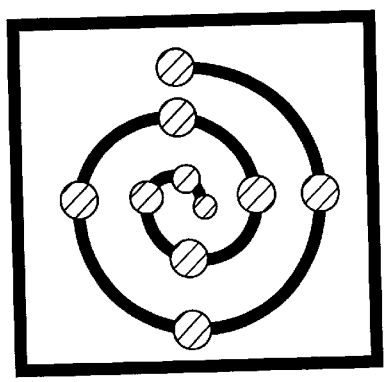
FIG. 5G is a diagram showing one example of a spiral code.

FIG. 3 is a diagram showing a relation among the camera image plane, a camera coordinate system of the image capturing section 1, and an object coordinate system.

For the object coordinate system defined by the object 4, an origin is Om, and a three-dimensional coordinate is (xm, ym, zm). On the other hand, for the camera coordinate system defined by the image capturing section 1, the origin is Oc, and the three-dimensional coordinate is (xc, yc, zc).

The camera image plane is axially constituted of a u-axis and v-axis. The u-axis runs in parallel with xc-axis of the camera coordinate system, v-axis runs in parallel with yc-axis, zc-axis for defining the camera coordinate system agrees with an optical axis of an optical system of the image capturing section 1, and a point at which the optical axis and camera image plane intersect each other (center of the camera image plane) is defined as (u0, v0).

A problem of estimating the three-dimensional position/orientation of the object disposed opposite to the image capturing section 1 returns to a problem of estimating the position/orientation of the object coordinate system with respect to the camera coordinate system, that is, a problem of calculating a coordinate conversion parameter to the camera coordinate system from the object coordinate system or a coordinate conversion parameter to the object coordinate system from the camera coordinate system.

This is mathematically represented, and can be defined as follows utilizing homogeneous matrix cHm or mHc.

$$\begin{bmatrix} x_c \\ y_c \\ z_c \\ 1 \end{bmatrix} = {}^cH_m \begin{bmatrix} x_m \\ y_m \\ z_m \\ 1 \end{bmatrix} = \begin{bmatrix} R & t \\ 0 & 1 \end{bmatrix} \begin{bmatrix} x_m \\ y_m \\ z_m \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 0 \end{bmatrix} \begin{bmatrix} x_m \\ y_m \\ z_m \\ 1 \end{bmatrix} \quad (1)$$

$$\begin{bmatrix} x_m \\ y_m \\ z_m \\ 1 \end{bmatrix} = {}^cH_m \begin{bmatrix} x_c \\ y_c \\ z_c \\ 1 \end{bmatrix} = \begin{bmatrix} R' & t' \\ 0 & 1 \end{bmatrix} \begin{bmatrix} x_c \\ y_c \\ z_c \\ 1 \end{bmatrix} = \begin{bmatrix} r'_{11} & r'_{12} & r'_{13} & t'_x \\ r'_{21} & r'_{22} & r'_{23} & t'_y \\ r'_{31} & r'_{32} & r'_{33} & t'_z \\ 0 & 0 & 0 & 0 \end{bmatrix} \begin{bmatrix} x_c \\ y_c \\ z_c \\ 1 \end{bmatrix} \quad (2)$$

Here, R=(rij), R'=(r'ij) denote a rotation matrix of 3×3, and t=(tx, ty, tz), t'=(t'x, t'y, t'z) denote three-dimensional translation vectors.

For a marker group {Mi; i=1, 2, . . . , m } described hereinafter in detail, the three-dimensional positions in the object coordinate system are measured beforehand, and the positions are represented by $(x_i^m, y_i^m, z_i^m)$. Moreover, an in-image position is represented by (ui, vi).

Then, when the image capturing section 1 is approximated by a pin hole camera model, the following relation is established between the coordinates.

$$\begin{bmatrix} U_i \\ V_i \\ W_i \end{bmatrix} = \begin{bmatrix} \alpha_u & 0 & u_0 & 0 \\ 0 & \alpha_v & v_0 & 0 \\ 0 & 0 & 0 & 0 \end{bmatrix} {}^cH_m \begin{bmatrix} x_i^m \\ y_i^m \\ z_i^m \\ 1 \end{bmatrix} \quad (3)$$

$$u_i = \frac{U_i}{W_i} \quad v_i = \frac{V_i}{W_i} \quad (4)$$

Here, (u0, v0) denotes a center in the image, (αu, αv) denotes an expansion ratio in u-direction and v-direction, they are camera internal parameters regarding the image capturing section 1, and the values can be estimated by camera calibration.

Figure 7:
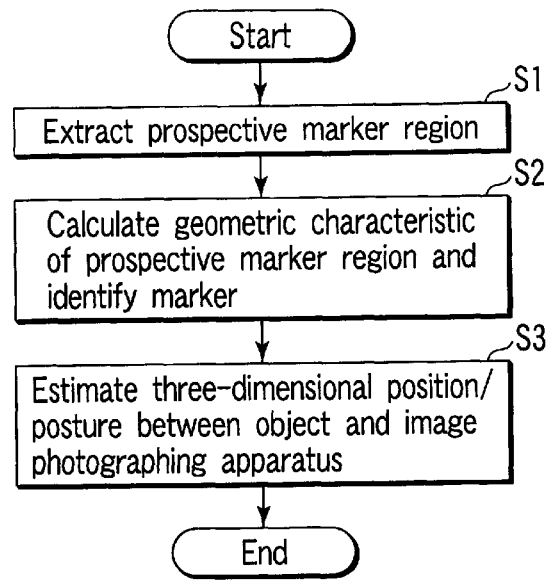
FIG. 7 is a flowchart showing a flow of operation for estimating a three-dimensional position/orientation of an object in the first embodiment.

A flow of operation for estimating the three-dimensional position/orientation of the object 4 after input of the image by the computer 2 will be described hereinafter with reference to a flowchart of FIG. 7.

First, the computer 2 having received the image extracts a prospective region estimated as a region corresponding to the code marker 5 from the image (stop S1).

Subsequently, the computer analyzes the inside of the prospective region extracted in the step S1 in detail, extracts a geometric characteristic corresponding to a code of the code marker 5 from the region, sets the region as a marker region when the code is recognized, and registers an in-image position and code (step S2). Subsequently, the computer utilizes an in-image two-dimensional position of the code marker 5 extracted from the registered image and the three-dimensional position of the marker with respect to the object to calculate the position of the object with respect to the image capturing section 1 (step S3).

The steps S1 to S3 of FIG. 7 will be described hereinafter in more detail.

(Step S1)

In the first embodiment, it is assumed that the image capturing section 1 generates a color image, and the code markers 5 shown in FIGS. 4A to 4H, FIGS. 5A to 5G, FIGS. 6A to 6C are assumed.

Since an outer frame of the code marker 5 is established from a single color, a color filter sensitive to the single color is introduced into algorithm.

Concretely, the following three vectors are calculated from filter measured values R (red), G (green), B (blue) constituting the color image with respect to an image point defined by an image plane (u, v).

$$i = (R+G+B)/3$$

$$r = R/(R+G+B)$$

$$g = G/(R+G+B)$$

Subsequently, the image region in which an allowable value of a color pattern in the image taken by the code marker 5 satisfies the following is extracted.

$imin < i < imax$ $rmin < r < rmax$ $gmin < g < gmax$

Here, the values of imin, imax, rmin, rmax, gmin, gmax, and the like are set beforehand.

Subsequently, the region corresponding to the code marker 5 is determined by filling holes in the image region.

(Step S2)

It is judged whether the next extracted region is the image of the marker.

For example, the image is compared with the marker image registered beforehand by pattern matching, so that the marker can be judged.

(Step S3)

A problem of the present stop S3 is to calculate the simultaneous conversion matrix cHm defined in the equation (3), when the in-image position (ui, vi) (i=1, 2, 3, . . . ) of the code marker 5 identified in the step S2 and the three-dimensional marker position ($xi^m$, $yi^m$, $zi^m$) of the marker in the object coordinate system are given.

This is basically performed by changing a method disclosed in a document (M. A. Fischler and R. C. Bolles, "Random sample consensus: A paradigm for model fitting with applications to image analysis and automated cartography", Communications of the ACM, Vol. 24, No. 6, June 1981, pp. 381 to 395) as follows.

The method introduced by this document comprises selecting three arbitrary markers which are not disposed in a straight line from a group of identified markers, and utilizing the three code markers to calculate a prospective solution of the coordinate conversion parameter between the camera coordinate system and the object coordinate system.

However, it is known that there are four solutions at maximum as the coordinate conversion parameter. Therefore, the non-selected marker group is utilized with respect to each of the four solutions to verify the solution, the solution is selected and used as an initial value, and all the code markers are utilized to update the solution.

This method will briefly be described hereinafter.

Three code markers which are not arranged in the straight line in the image are selected from the identified marker group according to a certain selection standard. As the selection standard, there is supposedly a method of selecting three code markers such that an area of a triangle having vertexes formed by the three code markers is maximum or minimum in the camera image plane.

The code markers obtained in this manner are set to Mi (i=1, 2, 3).

Figure 8:
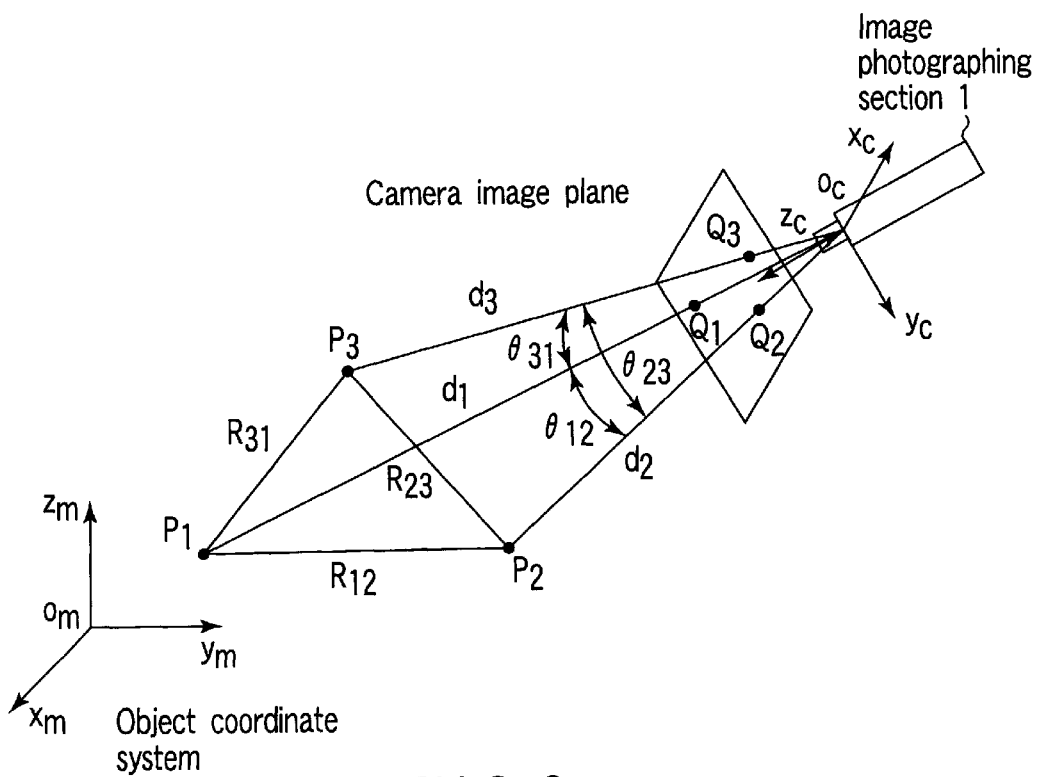
FIG. 8 Is a diagram showing three triangles $\Delta Oc\ Mi\ Mj$ (i, j=1, 2, 3; i is not equal to j) with respect to three code markers Mi.

Subsequently, three triangles ΔOc Mi Mj (i, j=1, 2, 3; i is not equal to j) shown in FIG. 8 are assumed with respect to these three code markers Mi (the three-dimensional positions of the code markers in the model coordinate system are represented by Pi(xim, yim, zim), and the in-image positions thereof are represented by Qi(ui, vi)).

For these three triangles, it is assumed that a distance between an origin Oc of a camera image diameter and each marker Mi is di, and an angle θij is formed by the markers Mi, Mj and the origin Oc of the camera coordinate system. Moreover, a distance between the markers Mi and Mj is represented by Rij.

In this case, distances R12, R23, R31 and angles θ12, θ23, θ31 have known values, but d1, d2, d3 have unknown values. Conversely, if the distances d1, d2, d3 can be calculated, the coordinate conversion parameter to the camera coordinate system from the object coordinate system can be calculated.

This respect will be described hereinafter.

(1) Calculating Method of Distances R12, R23, R31

The distance R12 is calculated as Euclidean distance between points P1 and P2. Similarly, the distances R23, and R31 are calculated as Euclidean distances between points P2 and P3, and P3 and P1, respectively.

(2) Calculating Method of Angles θ12, θ23, θ31

The angle θij formed by the markers M1, M2 and origin Oc of the camera coordinate system can be calculated as follows.

$(\tilde{u}_i, \tilde{v}_i)$

First, a normalized coordinate value of (ui, vi) is first calculated in the above equation. Then, the following equation is established.

$$\tilde{u}_i = \frac{u_i - u_0}{\alpha_u} \quad \tilde{v}_i = \frac{v_i - v_0}{\alpha_v}$$

The following normalized image point corresponds to (xc, yc) corresponding to zc=1 in the camera coordinate system.

$(\tilde{u}_i, \tilde{v}_i)$

Therefore, the following is established.

$$\cos\theta_{ij} = \frac{\tilde{u}_i \tilde{u}_j + \tilde{v}_i \tilde{v}_j + 1}{\sqrt{\tilde{u}_i^2 + \tilde{v}_i^2 + 1}\sqrt{\tilde{u}_j^2 + \tilde{v}_j^2 + 1}} =$$

-continued $$\frac{\frac{u_i-u_0}{\alpha_u}\frac{u_j-u_0}{\alpha_u}+\frac{v_i-v_0}{\alpha_v}\frac{v_j-v_0}{\alpha_v}+1}{\sqrt{\left(\frac{u_i-u_0}{\alpha_u}\right)^2+\left(\frac{v_i-v_0}{\alpha_v}\right)^2+1}\sqrt{\left(\frac{u_j-u_0}{\alpha_u}\right)^2+\left(\frac{v_j-v_0}{\alpha_v}\right)^2+1}}$$

The three angles can be calculated from cosine in this manner.

(3) Calculating Method of Distance di (i=1, 2, 3)

When a second cosine theorem is applied to Oc M1 M2, Oc M2 M3, Oc M3 M1 of the triangles, the following is derived.

$$R12 = d1^2 + d2^2 - 2d1\ d2\ \cos\theta 12$$

$$R23 = d2^2 + d3^2 - 2d2\ d3\ \cos\theta 23$$

$$R31 = d3^2 + d1^2 - 2d3\ d1\ \cos\theta 31$$

In these three equations, d1, d2, d3 are unknown, and there are also three constraint equations. Therefore, a solution $\{(d1(k), d2(k), d3(k):k=1, 2, 3, 4\}$ satisfying the above equation theoretically exists.

For the solution, as described in detail in the document (M. A. Fischler and R. C. Bolles, "Random sample consensus: A paradigm for model fitting with applications to image analysis and automated cartography", Communications of the ACM, Vol. 24, No. 6, June 1981, pp. 381 to 395), it is known that four solutions at maximum exist in this equation. The solution can solve the equation as a solution of a quaternary equation in a numerical analysis manner.

(4) Verification of Solution (d1, d2, d3) and Selection of Optimum Solution

Basically, only one of four solutions at maximum gives a correct solution.

In the present stage, the correct solution is verified out of the aforementioned solutions.

A method of calculating the marker position $(xi^c, yi^c, zi^c)$ in a camera coordinate system C with respect to each solution (d1, d2, d3) will be described.

The distance between the camera coordinate system origin C and the marker is di, the in-image position of the marker is (ui, vi), and the following equation results.

$$d_i = \sqrt{(x_i^c)^2 + (y_i^c)^2 + (z_i^c)^2}$$

$$D_i = \sqrt{\tilde{u}_i^2 + \tilde{v}_i^2 + 1}$$

$$x_i^c = \frac{d_i}{D_i}\tilde{u}_i$$

$$y_i^c = \frac{d_i}{D_i}\tilde{v}_i$$

$$z_i^c = \frac{d_i}{D_i}$$

It is now assumed that the marker position in the object coordinate system is $(xi^m, yi^m, zi^m)$. Then, conversion to camera coordinate system Oc from object coordinate system Om is represented as follows.

$$\begin{bmatrix} x_i^c \\ y_i^c \\ z_i^c \end{bmatrix} = R \begin{bmatrix} x_i^m \\ y_i^m \\ z_i^m \end{bmatrix} + t$$

Here, R denotes a rotation matrix, and t denotes a translation vector.

It is now assumed that gravity vectors of the marker group in both coordinate systems are $[xmean^c, ymean^c, zmean^c]^T$, $[xmean^m, ymean^m, zmean^m]T$. Then, the following equation is established.

$$\begin{bmatrix} x_i^c - x_{mean}^c \\ y_i^c - y_{mean}^c \\ z_i^c - z_{mean}^c \end{bmatrix} = R \begin{bmatrix} x_i^m - x_{mean}^m \\ y_i^m - y_{mean}^m \\ z_i^m - z_{mean}^m \end{bmatrix}$$

$$t = \begin{bmatrix} x_{mean}^c \\ y_{mean}^c \\ z_{mean}^c \end{bmatrix} - R \begin{bmatrix} x_{mean}^m \\ y_{mean}^m \\ z_{mean}^m \end{bmatrix}$$

Therefore, the translation vector and rotation matrix can be calculated by separate equations.

Examples of a method for solving the above equation with respect to i=1, 2, 3 include a quaternion method. This method is described in detail in document (B. K. P. Horn, "Closed-form solution of absolute orientation using unit quaternions", Journal of Optical Society of America A, Vol. 4, No. 4, 1987, pp. 629 to 642), and detail thereof is therefore omitted here.

When R, t are calculated in this manner, the simultaneous conversion matrix cHm can be calculated by equations (1, 2). This is repeated with respect to four solutions, and four solutions cHm(1), cHm(2), cHm(3), cHm(4) can be calculated.

Additionally, first non-selected code markers among the identified code markers are M4, M5, . . . , Mm.

A method of utilizing these M4, M5, . . . , Mm to determine a most suitable solution with respect to the respective simultaneous conversion matrixes cHm(k) (k=1, 2, 3, 4) will be described.

(1) In the following step, k which minimizes an evaluation function dist(k) with respect to each solution cHm(k) is calculated.

(2) with respect to each solution cHm(k) (k=1, 2, 3, 4), dist(k) is calculated by the following method.

a) The evaluation function is initialized dist(k);=0.

b) For markers Mj (j=4, 5, . . . , m) which are identified, but are not selected as the first three markers, the three-dimensional position $(xj^m, yj^m, zj^m)$ in the object coordinate system is converted to the camera image plane utilizing cHm(k). A projected image point is set to (uj', vj'). This can be calculated by the following equation.

$$\begin{bmatrix} U_j' \\ V_j' \\ W_j' \end{bmatrix} = \begin{bmatrix} \alpha_u & 0 & u_0 & 0 \\ 0 & \alpha_v & v_0 & 0 \\ 0 & 0 & 0 & 0 \end{bmatrix} c^H m^{(k)} \begin{bmatrix} x_i^m \\ y_i^m \\ z_i^m \\ 1 \end{bmatrix}, \quad u_j' = \frac{U_j'}{W_j'} \quad v_j' = \frac{V_j'}{W_j'}$$

Subsequently, a square error ej of the two-dimensional position (uj, vj) of the marker Mj actually measured in the image and projected image point (uj', vj') is calculated.

The square error ej can be calculated as follows.

$$e_j(u_j'-u_j)^2+(v_j'-v_j)^2$$

$$dist(k) = \sum_{j=4}^{m} e_j = \sum_{j=4}^{m}\{(u_j'-u_j^2)^2 + (v_j'-v_j)^2\}$$

(3) The solution cHm(k) of the simultaneous conversion matrix which minimizes dist(k) is selected.

In summary, for the optimum solution cHm(k) obtained in the aforementioned step, among the solutions generated from the code markers M1, M2, M3, the solution most supported by other markers M4, M5, ..., Mm is selected.

(5) Update of Solution

The solution cHm(k) selected in the above (4) is estimated from the code markers M1, M2, M3, and measured values with respect to the other markers M4, M5, ..., Mm are not utilized. In the present step, the solution cHm(k) calculated in the above (4) is set to an initial estimate value cHm(0), and the solution is updated by all the code markers Mi (i=1, 2, ..., m). That is, cHm is developed into an angle component (roll($\phi z$)–pitch($\phi y$)–yaw($\phi x$) angle) and translation component (tx, ty, tz), a six-dimensional unknown variable p=($\phi x$, $\phi y$, $\phi z$; tx, ty, tz) is obtained, and an initial estimate value is defined as $p^{(0)}=(\phi x^{(0)}, \phi y^{(0)}, \phi z^{(0)}; tx^{(0)}, ty^{(0)}, tz^{(0)})$.

Concretely, the value is defined by the following equation.

$$_cH_m = \begin{bmatrix} \cos\Phi_z\cos\Phi_y\cos\Phi_x\sin\Phi_y\sin\Phi_x - \sin\Phi_x\cos\Phi_x\cos\Phi_x\sin\Phi_y\cos\Phi_x + \sin\Phi_z\sin\Phi_x t_x \\ \sin\Phi_x\cos\Phi_y\sin\Phi_z\sin\Phi_y\sin\Phi_x + \cos\Phi_z\cos\Phi_x\cos\Phi_x\sin\Phi_y\cos\Phi_x - \cos\Phi_z\sin\Phi_x t_y \\ -\sin\Phi_y \qquad \cos\Phi_y\sin\Phi_x \qquad \cos\Phi_y\sin\Phi_x \qquad t_x \\ 0 \qquad 0 \qquad 0 \qquad 1 \end{bmatrix}$$

$$_cH_m^{(0)} = \begin{bmatrix} \cos\Phi_z^{(0)}\cos\Phi_y^{(0)}\cos\Phi_x^{(0)}\sin\Phi_y^{(0)}\sin\Phi_x^{(0)} - \sin\Phi_x^{(0)}\cos\Phi_x^{(0)}\cos\Phi_x^{(0)}\sin\Phi_y^{(0)}\cos\Phi_x^{(0)} + \sin\Phi_z^{(0)}\sin\Phi_x^{(0)} t_x^{(0)} \\ \sin\Phi_x^{(0)}\cos\Phi_y^{(0)}\sin\Phi_z^{(0)}\sin\Phi_y^{(0)}\sin\Phi_x^{(0)} + \cos\Phi_z^{(0)}\cos\Phi_x^{(0)}\cos\Phi_x^{(0)}\sin\Phi_y^{(0)}\cos\Phi_x^{(0)} - \cos\Phi_z^{(0)}\cos\Phi_x^{(0)} t_y^{(0)} \\ -\sin\Phi_y^{(0)} \qquad \cos\Phi_y^{(0)}\sin\Phi_x^{(0)} \qquad \cos\Phi_y^{(0)}\cos\Phi_x^{(0)} \qquad t_x^{(0)} \\ 0 \qquad 0 \qquad 0 \qquad 1 \end{bmatrix}$$

It is considered that a relation between the three-dimensional position $(xi^m, yi^m, zi^m)$ of the marker in the object coordinate system and the position (ui, vi) thereof in the camera image plane is utilized to update a six-dimensional position/orientation parameter p=($\phi x$, $\phi y$, $\phi z$; tx, ty, tz).

The relation between the three-dimensional position $(xi^m, yi^m, zi^m)$ of the marker in the object coordinate system and the position (ui, vi) thereof in the camera image plane is given by the following equation.

$$\begin{bmatrix} U_i \\ V_i \\ W_i \end{bmatrix} = \begin{bmatrix} \alpha_u & 0 & u_0 & 0 \\ 0 & \alpha_v & v_0 & 0 \\ 0 & 0 & 0 & 0 \end{bmatrix} {}_cH_m \begin{bmatrix} x_i^m \\ y_i^m \\ z_i^m \\ 1 \end{bmatrix} \qquad u_i = \frac{U_i}{W_i}, \quad v_i = \frac{V_i}{W_i}$$

This equation is put in order, and represented by the following secondary constraint equation with respect to each marker Mi (i=1, 2, ..., m).

$$f_i(p; x_i^m, y_i^m, z_i^m; u_i, v_i) = \begin{bmatrix} f_i^1(p; x_i^m, y_i^m, z_i^m; u_i, v_i) \\ f_i^2(p; x_i^m, y_i^m, z_i^m; u_i, v_i) \end{bmatrix} = 0$$

A problem is that the initial estimate value $p^{(0)}=(\phi x^{(0)}, \phi y^{(0)}, \phi z^{(0)}; tx^{(0)}, ty^{(0)}, tz^{(0)})$ of the six-dimensional parameter is used to estimate the six-dimensional parameter p=($\phi x$, $\phi y$, $\phi z$; tx, ty, tz).

This problem is a well-known non-linear equation problem, many authors introduce the solution, and therefore details are not described here.

All marker measured values are utilized to update the six-dimensional parameter in this manner, and the coordinate conversion parameter to the camera coordinate system from the object coordinate system is calculated. That is, the position relation between the object 4 and the image capturing section 1 can be calculated.

As described above, according to the first embodiment, even when a part of the marker group is shielded and cannot be detected, the three-dimensional position relation between the object 4 and the image capturing section 1 can be calculated only from the detected marker.

Moreover, during detection of the marker, when the code inherent to the marker is utilized, reliability of marker identification can extremely be enhanced as compared with the prior art, and stabler position/orientation measurement can be realized.

As described above, during the detection of the marker, three markers at minimum need to be detected. However, if four or more markers can be detected, reliability is further enhanced.

Here, as described above, FIGS. 4A to 4H, FIGS. 5A to 5G, FIGS. 6A to 6C show one example of the code marker 5 having a geometric characteristic.

Each code marker 5 has a geometric characteristic, and this is important in that a code sufficient for adding a label to the code marker 5 can be generated.

FIGS. 4A to 4H show shapes of the code marker which are preferable for analyzing one marker image and recognizing four characteristic points, FIGS. 4A, 4B show constitution examples of a square code marker, FIG. 4C shows one example of a trapezoidal code marker, FIG. 4D shows one example of a U-shaped code marker, FIGS. 4E, 4F show examples of a circular code marker, and FIG. 4G shows one example of a star-shaped code marker.

That is, when one marker is analyzed, information of the known characteristic points of four positions as substitutes for the aforementioned four code markers can be obtained.

In the code marker of FIG. 4A, the marker is detected by changing color inside and outside an outer frame and detecting a color difference, and four corners of the outer frame are recognized as the characteristic points having known positions by differentiating or fining the outer frame.

Furthermore, a direction of the marker is recognized by detecting a lower lateral line (inside the outer frame), and information is acquired by detecting eight points (including one middle point for recognizing the position) inside the outer frame. For a check digit, two left and right points (two points→two bits) inside the outer frame are used.

FIG. 4H shows that the characteristic points of the code marker (FIG. 4A) are detected. A coordinate value in an object coordinate of a lower left end of the outer frame is set to (u1, v1). Furthermore, the coordinate values of a right lower end, right upper end, and left upper end of the outer frame are set to (u2, v2), (u3, v3), and (u4, v4) in order. These four coordinate values are assigned to M1 to M4 described above, and it is possible to recognize the position/orientation of the object.

The code marker of FIG. 4B is similar to that of FIG. 4A except gnat the characteristic points are detected by detecting tour points in the four corners inside the outer frame.

Additionally, the code markers of FIGS. 4C, 4D are also basically similar to those of FIGS. 4A, 4B.

For the code marker of FIG. 4E, the marker is detected by changing color inside and outside the outer frame and detecting the color difference, and four-point detection is realized by detecting four points in four corners inside the outer frame. Furthermore, the direction of the marker is recognized by detecting the lower lateral line (inside the outer frame), and the information is acquired by detecting eight points (including one middle point for recognizing the position) inside the outer frame. Additionally, the two left and right points inside the outer frame (two points→two bits) are used for the check digit. The code marker of FIG. 4F is similar to that of FIG. 4E except that the four-points detection is realized by detecting four points in four corners outside the outer frame. Additionally, the code marker of FIG. 4G is similar to the code markers of FIGS. 4A to 4F.

FIGS. 5A to 5G show variations of the shape of the code inside the outer frame in which 8-bit information is stored. That is, the 8-bit information is stored by a circular code in FIG. 5A, a triangular code in FIG. 5B, a quadrangular code in FIGS. 5C, 5D, a character code in FIG. 5E, a linear code in FIG. 5F, and a spiral code in FIG. 5G. Additionally, it goes without saying that the code is not limited to these shapes.

Figure 6A:
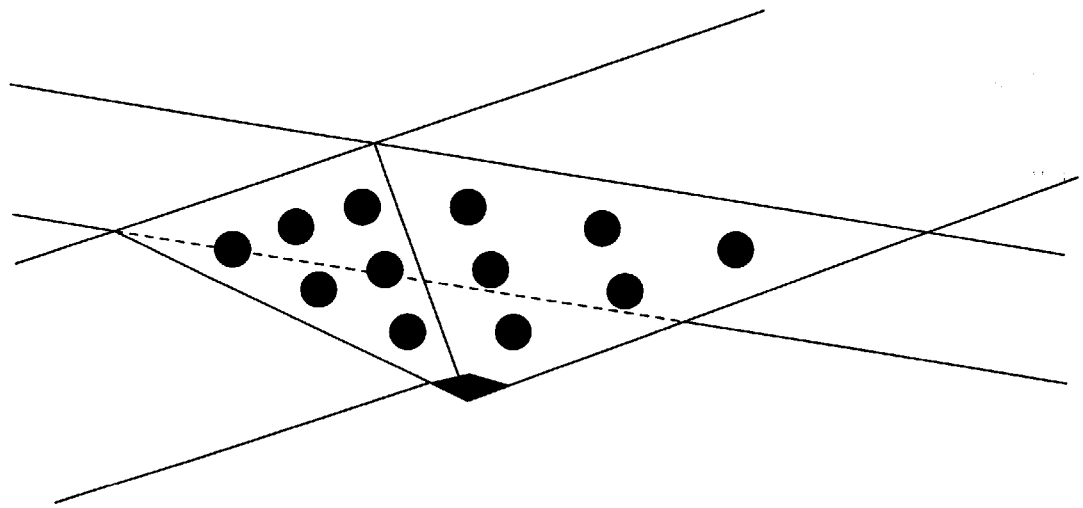
FIG. 6A is a perspective view of a symmetry/cubic mark.
Figure 6B:
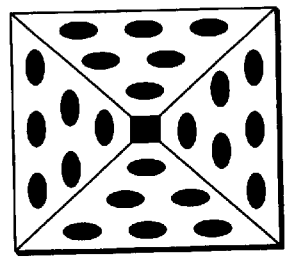
FIG. 6B is a top plan view of the symmetry/cubic mark.
Figure 6C:
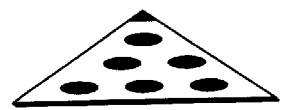
FIG. 6C is a side view of the symmetry/cubic mark.

FIGS. 6A to 6C show examples of a symmetry/cubic mark (hemispherical, pyramid shape). In the examples, even when the object is captured from an oblique direction, a recognition ratio is high. FIG. 6A is a perspective view, FIG. 6B is a top plan view, and FIG. 6C is a side view.

As described above, there are a plurality of markers. When one of the markers is analyzed, the position/orientation can be detected.

When a plurality of types (such as a marker size) of markers are prepared, the markers can be used as information indicating attributes of places such as a room including a room number, corridor, and stairs of a building. Moreover, the marker is constituted of self-emission type materials such as LED and LCD, and the self-emission type material is controlled, or the marker is projected by a projector as occasion demands. Then, the marker is not statically changed, and a dynamic marker can be constructed such that the marker can be changed according to the occasion. Furthermore, the self-emission type material may be lit in synchronization of an alarm lamp in case of emergency or disaster. In this case, the marker can be used as an automatic guide lamp during disaster.

The marker may be constructed by a reflective material which is used, for example, as a corner cube on a road, or the like. In this case, the marker can operate utilizing a slight light source attached to the capturing apparatus.

When the marker is constituted of a fluorescent material, the marker can operate even without lighting. Furthermore, the marker may be constructed with an infrared or ultraviolet wavelength which is sensitive to a projector, and the marker can operate in an invisible state to human eyes without impairing appearance.

A second embodiment will next be described.

In the three-dimensional position/orientation sensing apparatus according to the first embodiment, one of a plurality of markers is analyzed. In the second embodiment, there is provided means for switching position/orientation sensing by a plurality of markers or a single marker.

Figure 9:
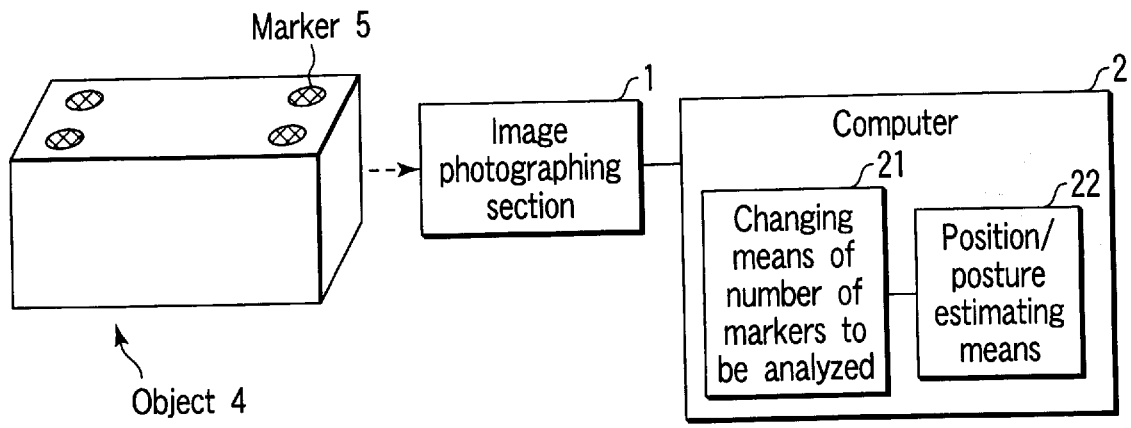
FIG. 9 is a constitution diagram of the three-dimensional position/orientation sensing apparatus according to a second embodiment.

FIG. 9 is an explanatory view of the second embodiment. There is provided changing means 21 of the number of markers to be analyzed With an instruction for position/orientation sensing by one marker, the changing means 21 analyzes, for example, the marker 5 positioned in a leftmost upper portion of a screen out of a plurality of found markers 5, and transfers the coordinate of the characteristic point detected from the outer frame to position/orientation estimating means 22. Moreover, with an instruction for position/orientation sensing by a plurality of markers, the changing means transfers the coordinate of the identified marker 5 to the position/orientation estimating means 22. Since an operation of the position/orientation estimating means 22 is described in detail in the first embodiment, description thereof is omitted.

A third embodiment will next be described.

In the third embodiment, the changing means 21 of the number of markers to be analyzed in the second embodiment operates in accordance with a visual field angle in the screen of the marker. Here, an angle of the marker which occupies in a horizontal angle of the screen is referred to as a visual field angle.

Figure 10:
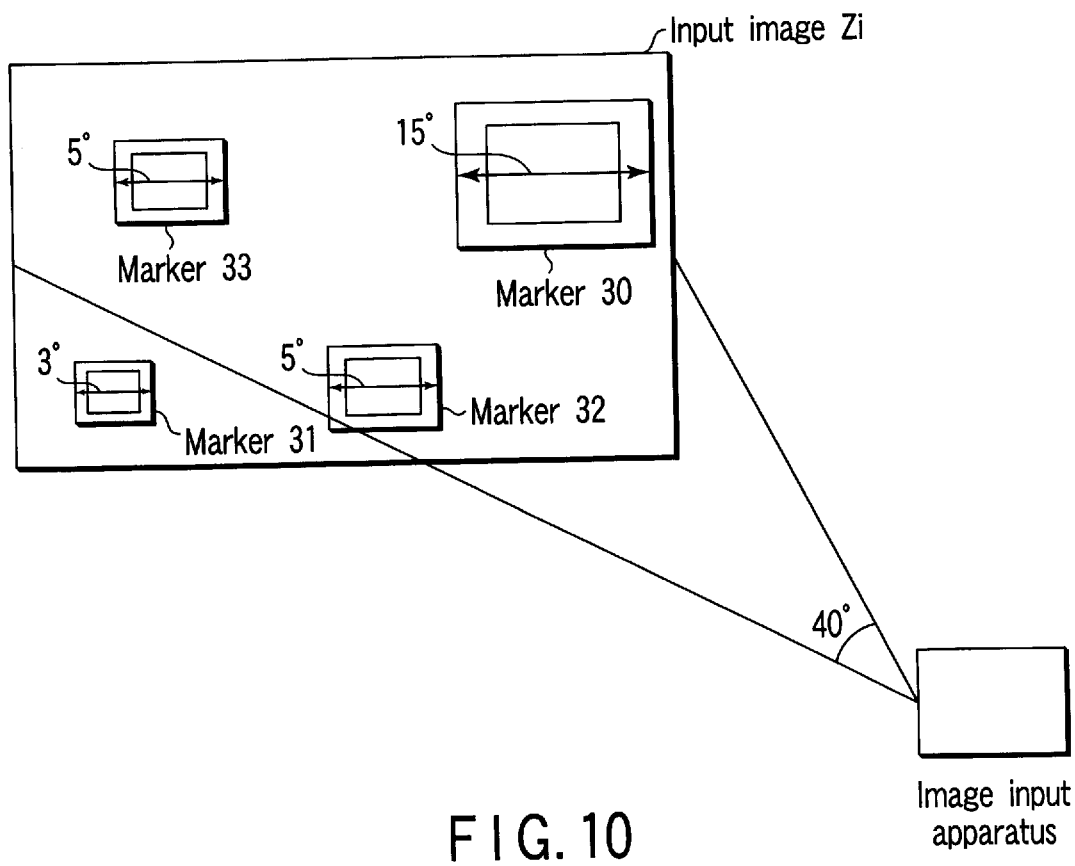
FIG. 10 is a diagram showing one example of a screen in which an image of the marker is inputted.

FIG. 10 shows a screen in which the image of the marker is inputted.

A screen angle of a horizontal direction is 40 degrees, and visual field angles of markers 30 to 33 occupying the screen in the horizontal direction are 15, 3, 5, 5 angles, respectively. The position/orientation sensing is switched between the sensing by the single marker and by four markers in the screen in accordance with the visual field angle of the marker 30 which has a largest visual field angle among the markers. It is now assumed that a threshold value for changing the sensing is 10 degrees.

In FIG. 10, since the angle of the marker 30 having the largest visual field angle exceeds ten degrees, the sensing by the single marker is performed. When all the markers have the visual field angle of ten or less degrees, the sensing by the plurality of markers is performed. Moreover, when all the markers have the visual field angle of ten or less degrees, and the number of markers is three or less, there is a sensing error. Here, the visual field angle is of the horizontal direction. However, the sensing can be changed in accordance with a visual field angle of a vertical direction, or an area occupied in the image in both directions.

A fourth embodiment of the present invention will next be described.

This relates to a method of estimating the three-dimensional position/orientation between the component other than the image capturing section 1 and the object 4. In the aforementioned embodiments, the example for measuring the position relation between the object 4 and the image capturing section 1 has been described.

In a more practical example, the image capturing section 1 and computer 2 shown in FIG. 1 are utilized as a position sensor for estimating the position/orientation of the object 4. In this case, another apparatus is disposed in a system including the position sensor, and a coordinate defined by the apparatus is considered to be a system coordinate as a reference of the system in many cases.

In this case, the computer 2 stores the coordinate conversion parameter from the camera coordinate system defined by the image capturing section 1 to the reference coordinate system defined by another apparatus beforehand. The computer 2 utilizes the coordinate conversion parameter to calculate the coordinate conversion parameter to the reference coordinate system from the object coordinate system. Moreover, the three-dimensional position/orientation of the object 4 in the reference coordinate system is estimated.

According to the fourth embodiment, the means of the present invention can also be utilized as the position/orientation sensor for another apparatus.

The embodiments of the present invention have been described above, but the present invention is not limited to the embodiments, and can variously be modified or altered without departing from the scope.

Finally, claimed image input means is a concept included in the image capturing section 1. Identifying means, position/orientation detecting means by the single marker, position/orientation detecting means by a plurality of markers, and changing means are concepts included in the computer 2.

As described above in detail, according to the present invention, the image obtained by capturing the marker having the known position/orientation relation with the object is analyzed, a relative position/orientation relation between the marker and capturing means is obtained, and the relation is used to obtain the position and orientation of the object. In this case, there can be provided a three-dimensional position/orientation sensing apparatus for measurement in a relatively broad region.

Figure 11A:
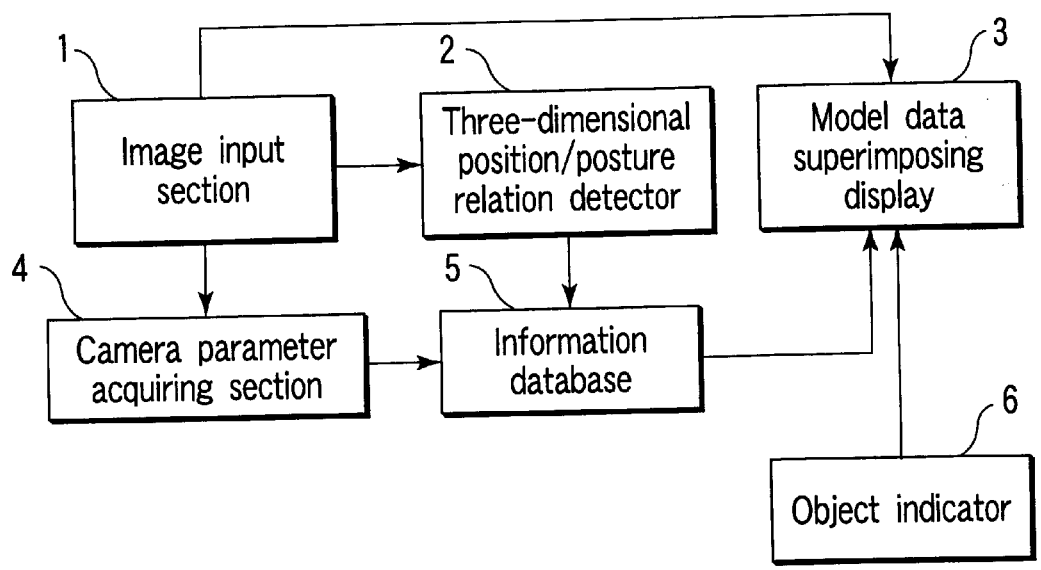
FIG. 11A is a block diagram showing a constitution of an information presenting system according to a fifth embodiment of the present invention.
Figure 11B:
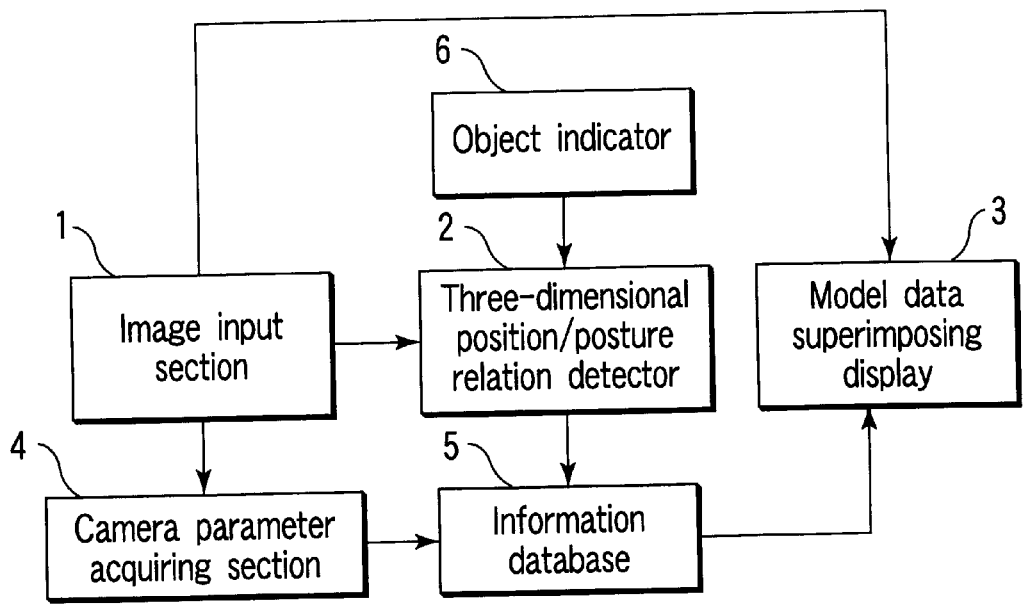
FIG. 11B is a block diagram showing a constitution of the information presenting system according to the fifth embodiment of the present invention.

FIGS. 11A, 11B are block diagrams showing a constitution of an information presenting system according to a fifth embodiment of the present invention.

A constitution and action of the present system will be described in detail.

First, in a constitution example of the information presenting system shown in FIG. 11A, an output of the image input section 1 is connected to inputs of a three-dimensional position/orientation relation detector 2, model data superimposing display 3, and camera parameter acquiring section 4. Outputs of the three-dimensional position/orientation relation detector 2 and camera parameter acquiring section 4 are connected to an input of an information database 5. Moreover, outputs of the information database 5 and object indicator 6 are connected to the input of the model data superimposing display 3.

On the other hand, in a constitution example of the information presenting system shown in FIG. 11B, the output of the image input section 1 is connected to the inputs of the three-dimensional position/orientation relation detector 2, model data superimposing display 3, and camera parameter acquiring section 4. The outputs of the three-dimensional position/orientation relation detector 2 and camera parameter acquiring section 4 are connected to the input of the information database 5. Moreover, the outputs of the information database 5 and image input section 1 are connected to the input of the model data superimposing display 3. Additionally, the output of the object indicator 6 is connected to the input of the three-dimensional position/orientation relation detector 2.

Here, FIG. 11A shows a constitution example of two-dimensional pointing by the object indicator 6 on a display screen (two-dimensionally projected screen) of the model data superimposing display 3, and FIG. 11B shows a constitution example of indication by a laser pointer as the object indicator 6 in a real space for pointing in the three-dimensional coordinate.

In the aforementioned constitution, the marker having the known three-dimensional position relation with the object is captured by the capturing apparatus (not shown), and the image of the marker is inputted to the present system via the image input section 1. The three-dimensional position/orientation relation detector 2 uses the position of the marker on the image to obtain the position/orientation relation between the object and the capturing apparatus. Moreover, the model data superimposing display 3 displays a real image of the object inputted via the image input section 1, and superimposes/displays three-dimensional model data of the object with a position, size and direction based on the position/orientation relation.

Moreover, attribute information of a desired object indicated by the object indicator 6 in the screen of the model data superimposing display 3 can also be superimposed/displayed in the model data superimposing display 3 by appropriately referring to the information database 5. The attribute information includes a name display of the object, and a code for indicating the object from the name display, such as a pointer. A display position of the attribute information may be set by the object indicator 6 so that the displays of various attribute information do not interfere with each other.

During superimposing display, the three-dimensional model data or the attribute information is superimposed/displayed on the screen with a color different from a display color of the object. Moreover, the data or the information may also be displayed on a wall surface or a ceiling surface around the object on the image.

The three-dimensional model data is displayed in a coated surface in which a background is seen through.

The three-dimensional model data can be displayed in the model data superimposing display 3, even when the object is shielded by a shielding material, and is not displayed in the image. A display mode will be described later with reference to the drawing.

Here, the three-dimensional position/orientation relation detector 2 recognizes the marker in the image inputted to the present system via the image input section 1, and obtains the position/orientation relation between the capturing apparatus and the object. Since the method is already proposed by Jpn. Pat. Appln. KOKAI Publication No. 2000-227309 by the present applicant, description thereof is omitted.

A visual marker disposed on or in the vicinity of the object may be employed as the marker. The visual marker has a broader detectable range as compared with a magnetic or acoustic marker. Moreover, when the appearance of the building as the object is not to be impaired, a marker invisible to human eyes can be employed. Alternatively, the position/orientation relation can also be obtained by detecting the characteristic point of the object. Additionally, the marker projected onto the object by the projector can also be used.

Actual various display modes by the information presenting system according to the fifth embodiment will be described hereinafter in detail with reference to FIGS. 12 to 21.

First, a mode of annotation display will be described with reference to FIGS. 12 to 14.

Figure 12:
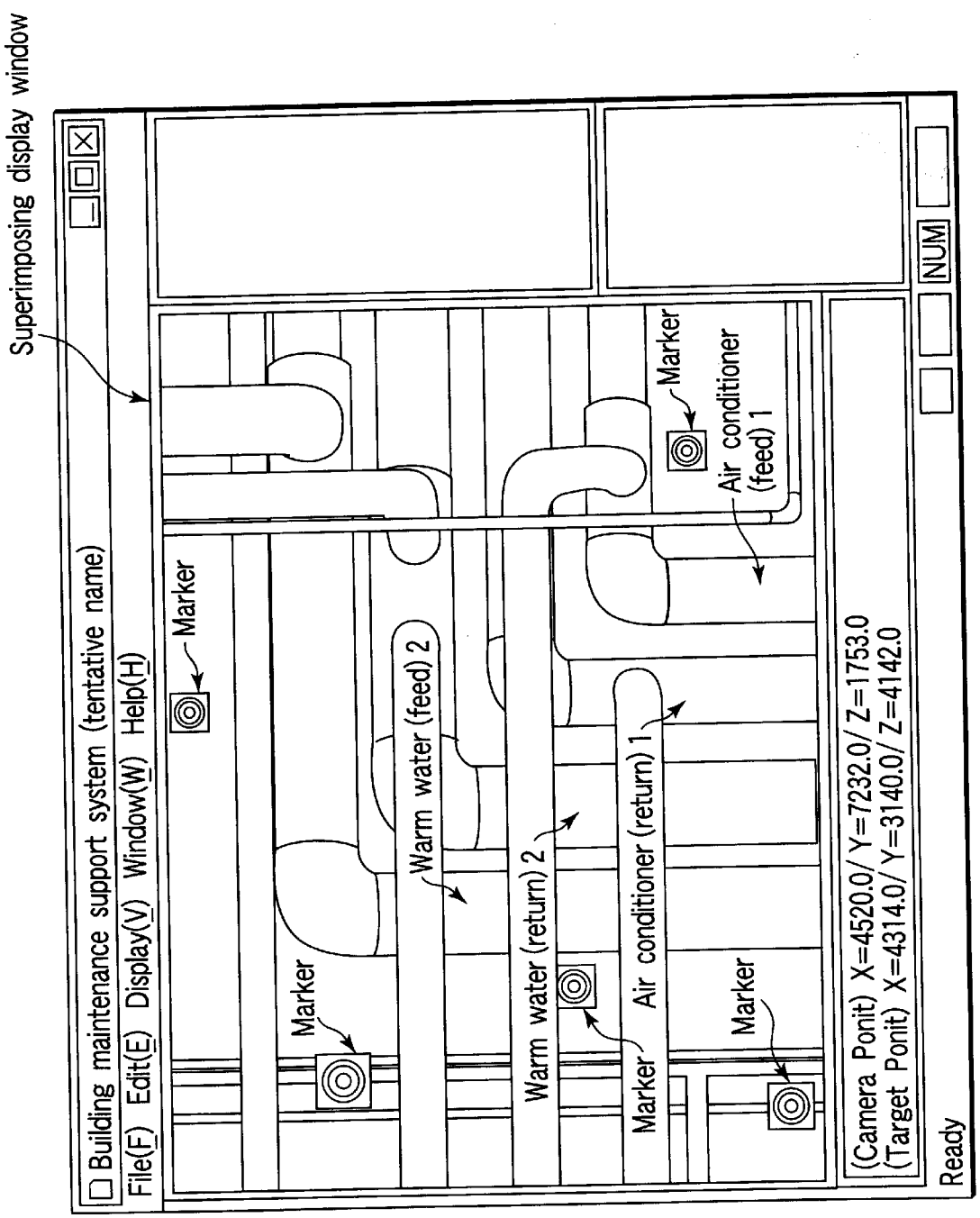
FIG. 12 is an explanatory view of an annotation display mode by the information presenting system according to the fifth embodiment.

When a live video image is inputted from the camera via the image input section 1, as shown in FIG. 12, the live video image is displayed in the model data superimposing display 3. In this case, the three-dimensional position/orientation relation detector 2 recognizes the information of the marker in the live video image, starts estimating the position/orientation of the camera, reads names of all objects (in which associated data exists) in the visual field from the information database 5, and superimposes/displays the names in the model data superimposing display 3.

In FIG. 12, "warm water (feed) 2", "warm water (return) 2", "air conditioner (return) 1", and "air conditioner (feed) 1" are superimposed/displayed as the names on the live video image.

A user operates the object indicator 6 such as a mouse and track ball in this state to indicate the object (e.g., warm water (feed) 2) whose detailed data is to be displayed. As shown in FIG. 13, member attribute information is displayed in a right upper portion of the screen, repair history information is displayed in a right lower portion of the screen, and system information is displayed in a lower portion of the screen.

An associated file name, type, apparatus number, model number, object name, work type, length and number, and the like of the selected object are displayed as the member attribute information. Moreover, a camera position and object position are displayed as the system information. These are displayed in a text file.

Moreover, as shown in FIG. 13, 3D model data of a piping model as the selected object is superimposed/displayed on the live video image. In this example, a wire frame display is performed with respect to the selected object.

Figure 14:
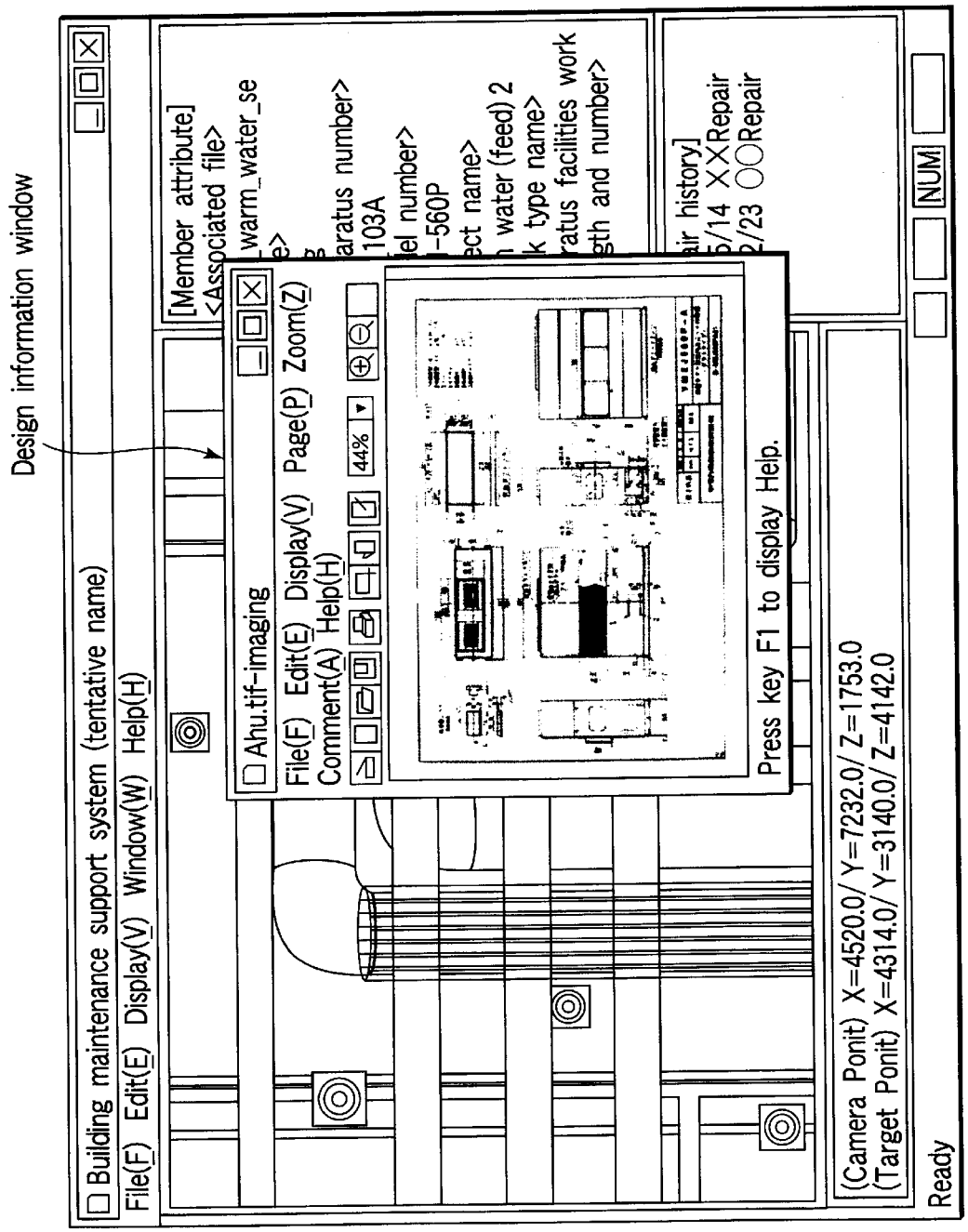
FIG. 14 is an explanatory view of the annotation display mode by the information presenting system according to the fifth embodiment.

When the object indicator 6 is further operated in this state, as shown in FIG. 14, detailed design information of the selected object can be displayed in a separate window. Here, a design plan is displayed.

Additionally, it is of course possible to enlarge or reduce the live video image. In this case, the image is displayed based on a predetermined camera parameter from the camera parameter acquiring section 4 in the model data superimposing display 3.

Moreover, it is of course possible to employ a method of first displaying a macro image obtained by the camera, designating the desired region by the object indicator 6 such as the mouse on the display, and displaying detailed image or information in the region. Additionally, since the method is known, detailed description thereof is omitted.

Figure 15:
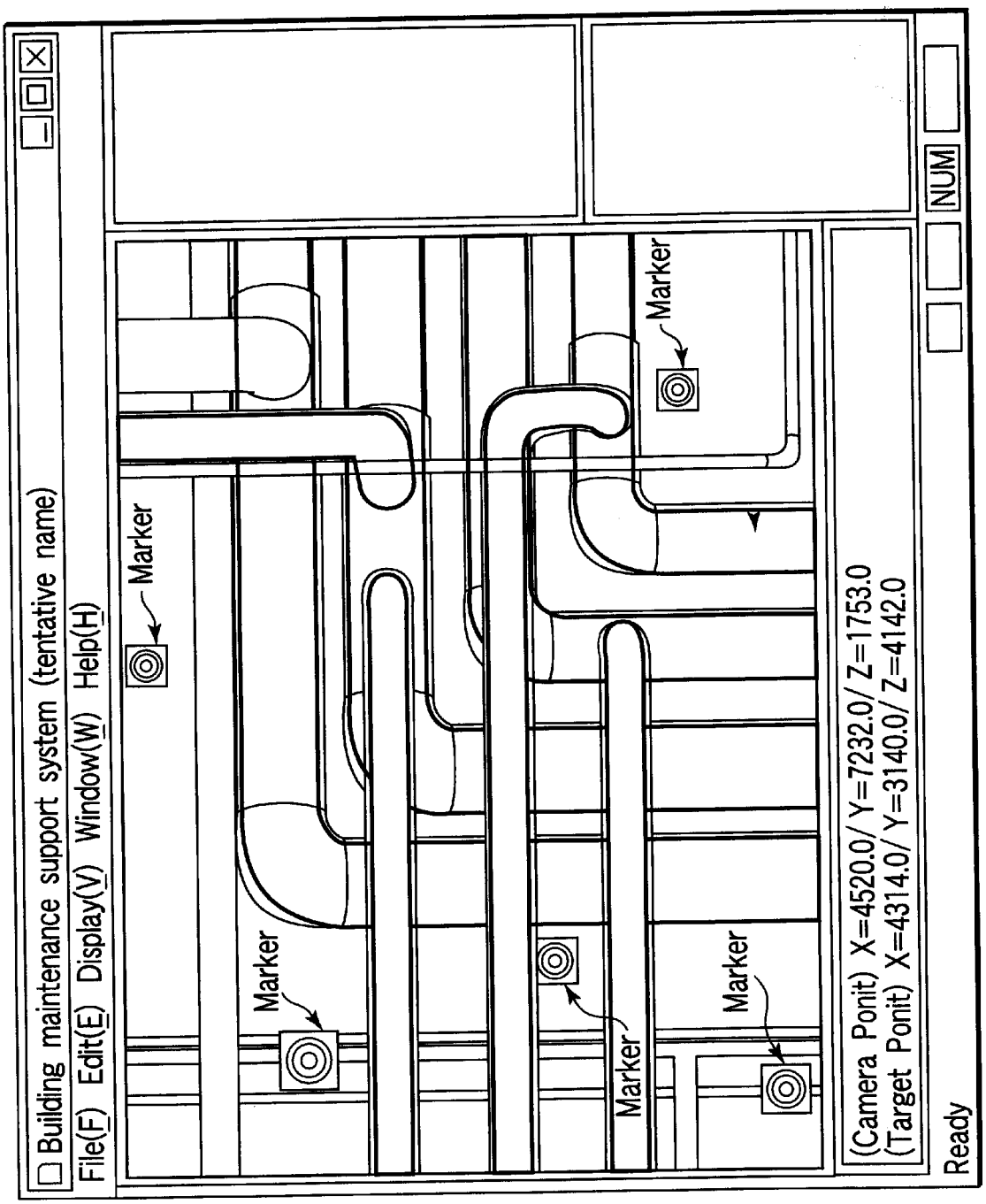
FIG. 15 is an explanatory view of a mode for comparing/displaying a finished object and a design plan by the information presenting system according to the fifth embodiment.

A mode for comparing/displaying a finished object and a design plan will next be described with reference to FIGS. 15 to 17. When the live video image is inputted from the camera via the image input section 1 in this mode, as shown in FIG. 15, the live video image is displayed in the model data superimposing display 3. In this case, the three-dimensional position/orientation relation detector 2 recognizes marker information in the live video image, starts estimating the position/orientation of the camera, and superimposes/displays the 3D model data of all the objects (in which the associated data exists) in the visual field in a translucent state on the live video Additionally, transmittance of the 3D model dots can appropriately be adjusted.

In FIG. 15, for convenience of description, the live video image is shown by a fine line, and the 3D model data is displayed by a bold line.

The user watches the display of the model data superimposing display 3, and can compare the finished object of the live video image with the 3D model data generated from the design plan.

The user operates the object indicator 6 such as the mouse and track ball in this state to indicate the object whose detailed data is to be displayed. As shown in FIG. 16, the member attribute information is displayed in the right upper portion of the screen, the repair history information is displayed in the right lower portion of the screen, and system information is displayed in the lower portion of the screen.

The associated file name, type, apparatus number, model number, object name, work type, length and number, and the like of the selected object are displayed as the member attribute information. Moreover, repair date and content of the selected object are displayed as the repair history information Furthermore, the camera position and object position are displayed as the system information. These are displayed in the text file.

Figure 16:
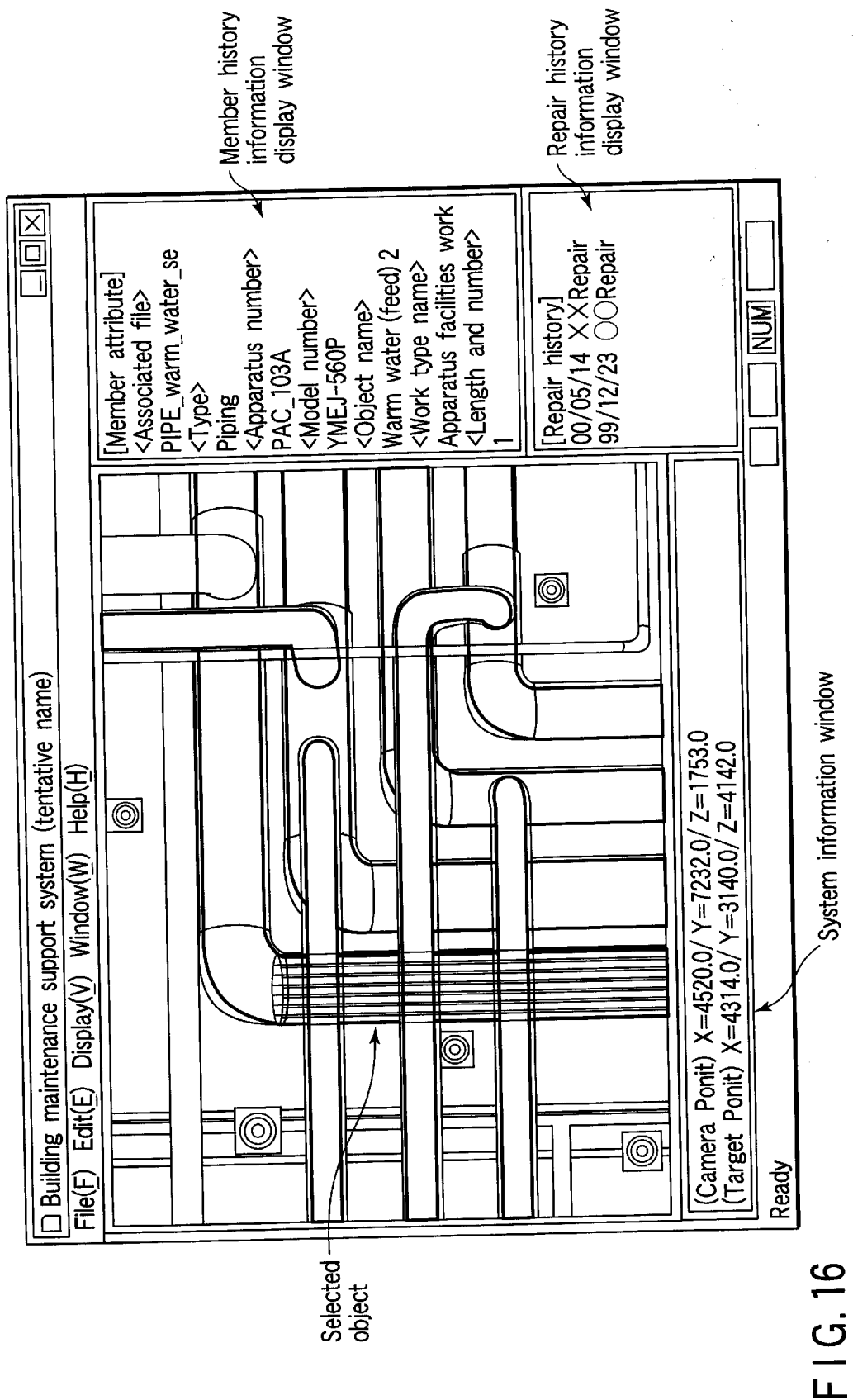
FIG. 16 is an explanatory view of the mode for comparing/displaying the finished object and the design plan by the information presenting system according to the fifth embodiment.
Figure 17:
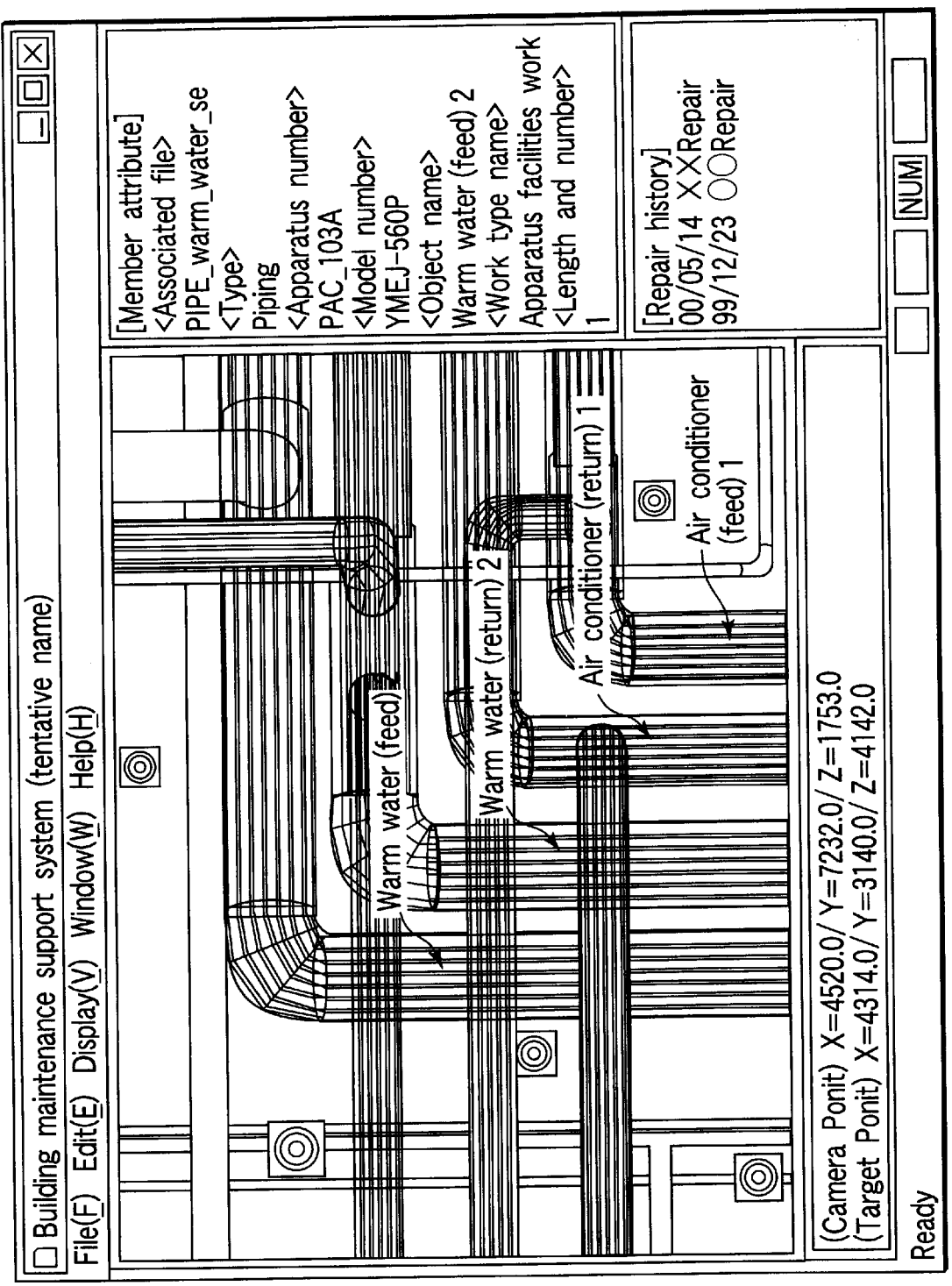
FIG. 17 is an explanatory view of the mode for comparing/displaying the finished object and the design plan by the information presenting system according to the fifth embodiment.
Figure 18:
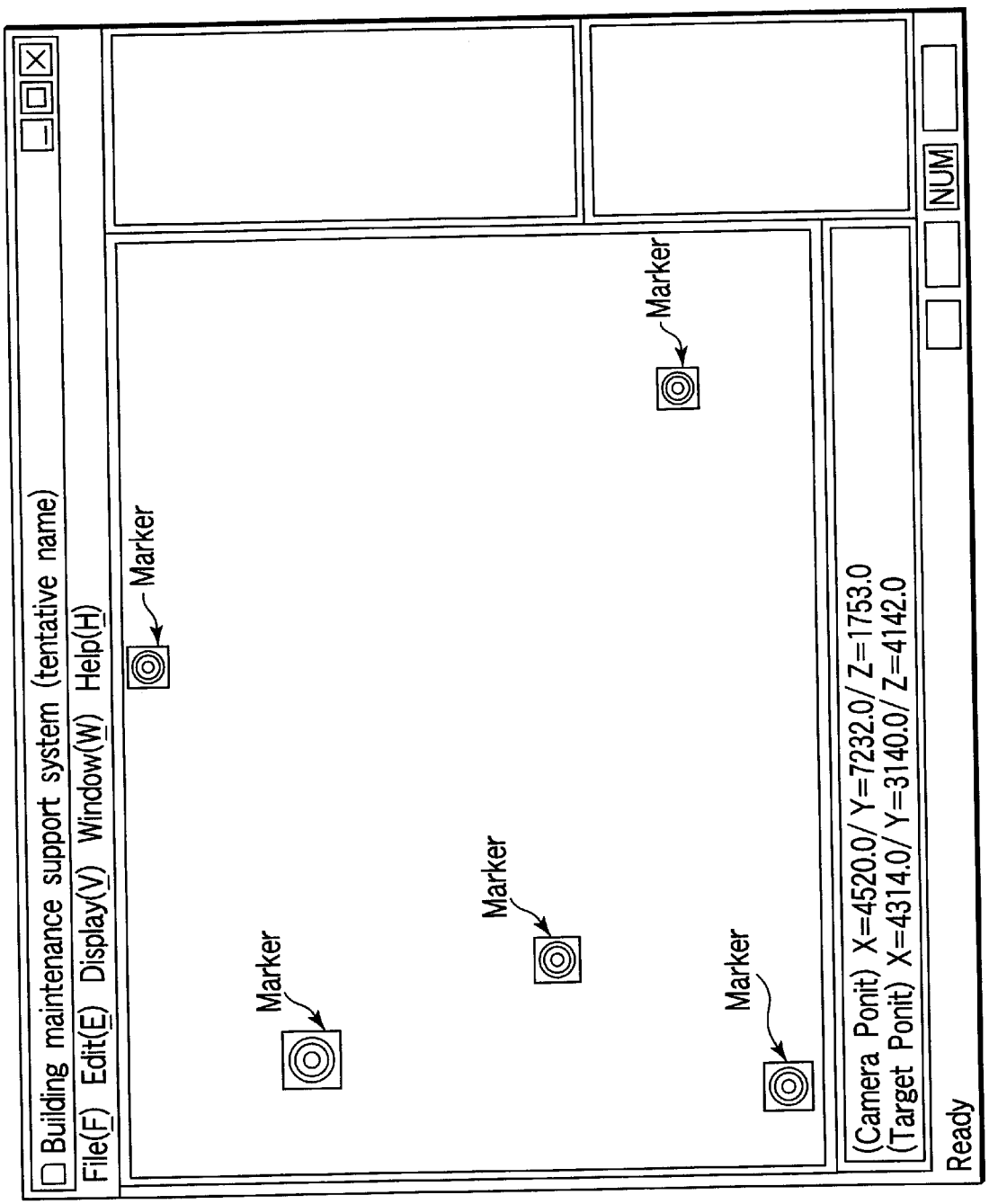
FIG. 18 is an explanatory view of a mode for displaying a model of a back side of a wall by the information presenting system according to the fifth embodiment.

Moreover, as shown in FIG. 16, the 3D model data of the piping model as the selected object is superimposed/displayed in a wire frame display on the live video image. Furthermore, in FIG. 15, the 3D model data is superimposed/displayed in the translucent state. However, the 3D model data can all be displayed in the wire frame as shown in FIG. 17.

A mode for displaying a model of a back side of a wall will next be described with reference to FIGS. 18 to 21. First, only the marker is displayed in the model data superimposing display 3 in an initial state shown in FIG. 18.

Since the position of the marker is known in the coordinate system, the three-dimensional position/orientation relation detector 2 starts estimating the position/orientation of the camera, and superimposes/displays the 3D model data in the model data superimposing display 3 as shown in FIG. 19.

Figure 20:
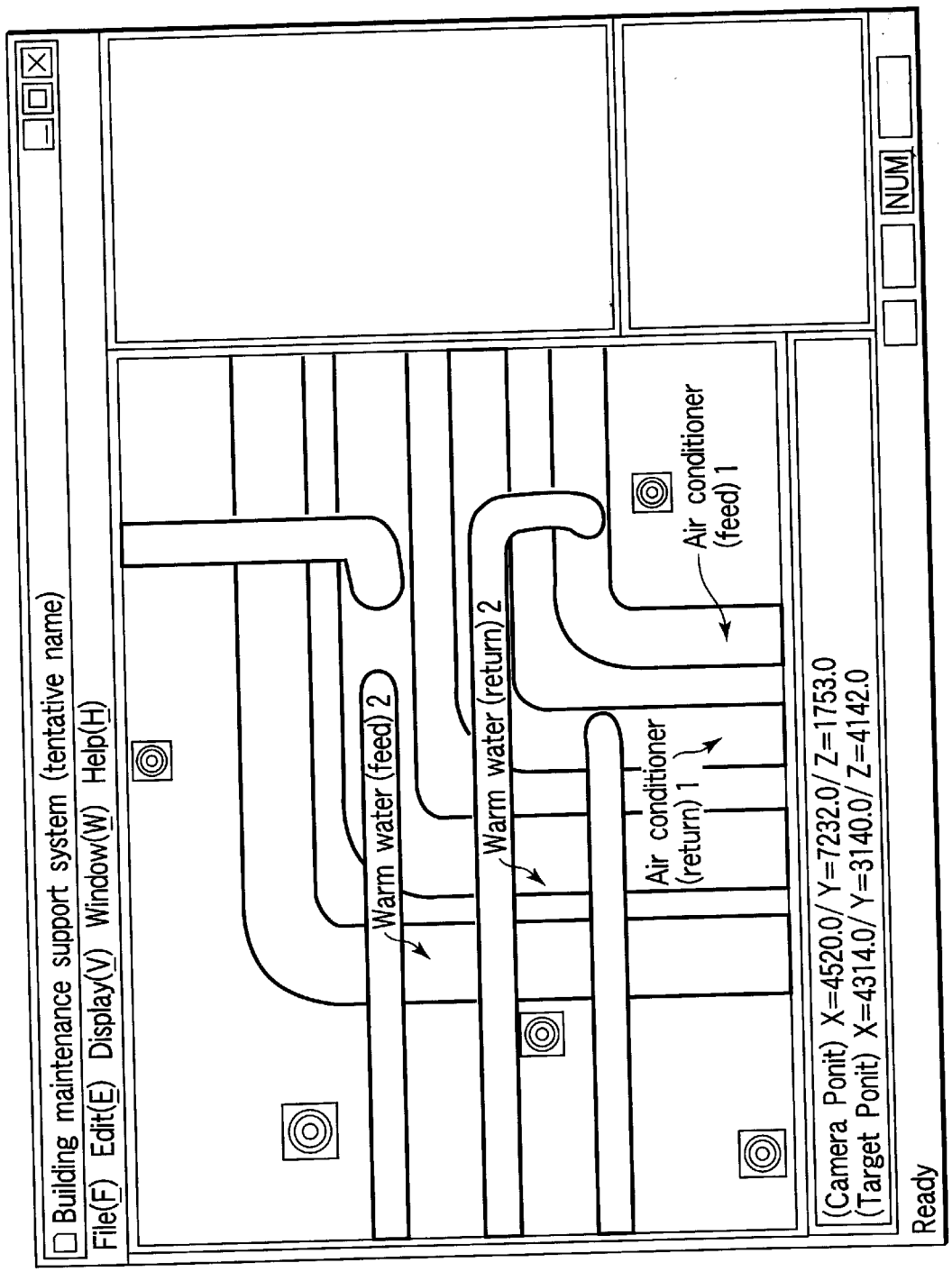
FIG. 20 is an explanatory view of the mode for comparing/displaying the finished object and the design plan by the information presenting system according to the fifth embodiment.

In this case, as shown in FIG. 20, the names of all the objects (in which the associated data exists) are read from the information database 5, and superimposed/displayed in the model data superimposing display 3 That is, "warm water (feed) 2", "warm water (return) 2", "air conditioner (return) 1", and "air conditioner (feed) 1" are superimposed/displayed as the names.

Figure 21:
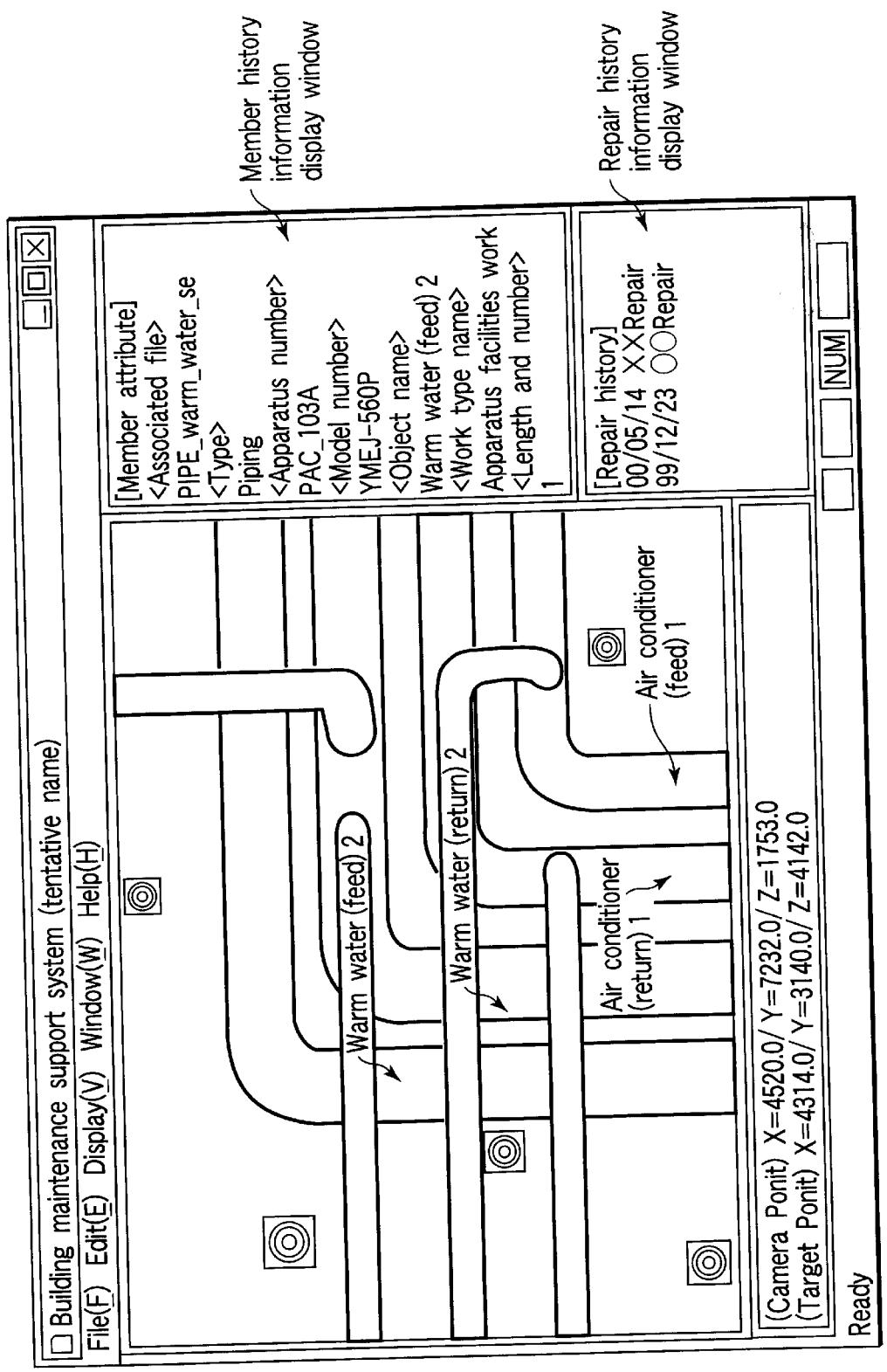
FIG. 21 is an explanatory view of the mode for comparing/displaying the finished object and the design plan by the information presenting system according to the fifth embodiment.

The user operates the object indicator 6 such as the mouse and track ball in this state to indicate the object whose detailed data is to be displayed. As shown in FIG. 21, the member attribute information is displayed in the right upper portion of the screen, the repair history information is displayed in the right lower portion of the screen, and the system information is displayed in the lower portion of the screen.

The associated file name, type, apparatus number, model number, object name, work type, length and number, and the like of the selected object are displayed as the member attribute information. Moreover, the repair date and content of the selected object are displayed as the repair history information. Furthermore, the camera position and object position are displayed as the system information. These are displayed in the text file.

Moreover, as shown in FIG. 21, the 3D model data of the piping model as the selected object is superimposed/displayed in the wire frame display by operating the object indicator 6 such as the mouse.

A model error detecting system for detecting a dynamic error will next be described in detail as a sixth embodiment of the present invention.

Here, a "deviation" between the object and the model data is measured.

Additionally, when precision is required, a laser measuring device, and the like are combined for measurement.

When a registered position of the object in a reference point coordinate deviates from an actual object (because of an external factor, design error, and the like), the registered position needs to be corrected. However, in the sixth embodiment, the registered position is corrected by the following method.

That is, in the sixth embodiment, an object model M is displayed on the screen in accordance with the registered position of the object in the reference point coordinate. In this case, an actual object R is captured, and superimposed upon the model. Subsequently, a side length, thickness, and other constitutions of the object R in the image are recognized, and compared with those of the object model M, a difference between the object and the model is obtained, and an error E is obtained on a projected screen. That is, an object region is extracted from the object R, and an element constituting the object R is fined/thinned. Subsequently, a difference between the thinned object R and the object model M is obtained, and recognized, and the error B is measured.

This error E can be measured, for example, by the following method.

That is, the method first comprises using the mouse or another pointing device to indicate points as comparison objects in the object R and object model M, obtaining a difference of coordinate of the point, and obtaining an error in a two-dimensional projection coordinate in a visual field direction. In this case, images from a plurality of directions are used to perform the processing of obtaining the error in the two-dimensional projection coordinate in the visual field direction in the position designated by the pointing device as indicating means. Thereby, a three-dimensional error (cubic error data) can be obtained.

Secondly, the method comprises taking the image of the object R into the computer by an image take-in section, and matching patterns of the image obtained by two-dimensionally projecting the three-dimensional model data of the object R and the image of the object R, so that the error E can be detected.

Thirdly, even when the difference between the image of the present object R and the image of the object R captured in the same visual field in the past is obtained, the error E can be obtained. The model data of the past captured object R is prepared based on the image of the past projected object or the image of the present object R.

Fourthly, when the capturing apparatus, or the relative three-dimensional position/orientation relation between the capturing apparatuses is known beforehand, the error E of the position coordinate data can be obtained by using the measuring device to measure the distance between the capturing apparatus and the object R, and comparing the distance with the distance between the object R and the capturing apparatus registered as the three-dimensional model in the reference point coordinate.

Fifthly, when a volume obtained using the image of the object R, and the distance between the object R and the capturing apparatus actually measured by the measuring device are compared with volume data held beforehand, the error can be obtained.

The embodiments of the present invention have been described above, but the present invention is not limited to the embodiments, and can variously be modified or altered without departing from the scope.

As described above in detail, according to the present invention, there can be provided an information presenting system and model error detecting system in which it is easy to compare the captured image of the actual object with the object data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A three-dimensional position/orientation sensing apparatus for measuring a relative three-dimensional position/orientation relation between an object and a capturing apparatus from an image captured by the capturing apparatus, said sensing apparatus comprising:

an image input section which inputs the image obtained by capturing said object and a plurality of markers each having a known geometric characteristic and a known three-dimensional position/orientation relation with respect to said object, by using said capturing apparatus;

an identifying section which uses the geometric characteristic of at least one of the plurality of markers to identify said at least one of the markers in the image inputted from said image input section; and a position/orientation detecting section by a single marker, which analyzes the image of one of said at least one of the markers identified by said identifying section, obtains a relative position/orientation relation between said one marker and said capturing apparatus, and obtains the three-dimensional position/orientation relation between said object and said capturing apparatus.

2. The three-dimensional position/orientation sensing apparatus according to claim 1, further comprising:

a position/orientation detecting section by a plurality of markers, which obtains the relative position/orientation relation between said one marker and said capturing apparatus by analyzing the plurality of markers, and obtains the three-dimensional position/orientation relation between said object and said capturing apparatus; and a changing section which selectively changes said position/orientation detecting section by the single marker and said position/orientation detecting section by the plurality of markers.

3. The three-dimensional position/orientation sensing apparatus according to claim 2, wherein said changing section changes said position/orientation detecting section by the single marker and said position/orientation detecting section by the plurality of markers based on a visual field angle of the marker on the image.

4. The three-dimensional position/orientation sensing apparatus according to claim 1, wherein said position/orientation detecting section by the single marker detects a plurality of characteristic portions from the image of said marker, compares a position relation of said characteristic portion on the image with a position relation of said characteristic portion on an actual marker, and obtains the relative position/orientation relation between said marker and said capturing apparatus.

5. The three-dimensional position/orientation sensing apparatus according to claim 4, wherein a shape of said marker is a quadrangular or further polygonal, and said position/orientation detecting section by the single marker detects a vertex of a polygonal shape as said characteristic portion.

6. The three-dimensional position/orientation sensing apparatus according to claim 1, wherein said marker includes information indicating a size of the marker.

7. The three-dimensional position/orientation sensing apparatus according to claim 1, wherein said marker includes information indicating an attribute of a place of the marker.

8. The three-dimensional position/orientation sensing apparatus according to claim 1, wherein said marker is formed of a self-emission type material.

9. The three-dimensional position/orientation sensing apparatus according to claim 8, wherein the marker formed of said self-emission type material is lit in synchronization with an alarm lamp during emergency/disaster.

10. The three-dimensional position/orientation sensing apparatus according to claim 1, wherein said marker is formed of a reflective material for reflecting and reversing an incident light along an incident light path.

11. The three-dimensional position/orientation sensing apparatus according to claim 1, wherein said marker is formed of a fluorescent material.

12. The three-dimensional position/orientation sensing apparatus according to claim 1, wherein said marker is invisible to human eyes.

13. The three-dimensional position/orientation sensing apparatus according to claim 1, wherein said marker is projected by a projector.

14. A three-dimensional position/orientation sensing apparatus for measuring a relative three-dimensional position/orientation relation between an object and a capturing apparatus from an image captured by the capturing apparatus, said sensing apparatus comprising:

image input means for inputting the image obtained by capturing said object and a plurality of markers each having a known geometric characteristic and a known three-dimensional position/orientation relation with respect to said object, by using said capturing apparatus;

identifying means for using the geometric characteristic of at least one of the plurality of markers to identify said at least one of the markers in the image inputted from said image input means; and position/orientation detecting means by a single marker, for analyzing the image of one of said at least one of the markers identified by said identifying means, obtaining a relative position/orientation relation between said one marker and said capturing apparatus, and obtaining the three-dimensional position/orientation relation between said object and said capturing apparatus.

15. An information presenting system comprising:

an image input section which inputs an image obtained by capturing a marker whose three-dimensional position relation with an object is known by a capturing apparatus;

a position/orientation detecting section which uses a position of the marker on said image to obtain a position/orientation relation between said object and said capturing apparatus; and a display section which displays three-dimensional model data of said object on said image with a position, a size, and a direction based on said position/orientation relation.

16. The information presenting system according to claim 15, further comprising a display section which displays attribute information of said object.

17. The information presenting system according to claim 15, further comprising an object indicating section which indicates a desired object from a plurality of objects.

18. The information presenting system according to claim 15, wherein at least one of said three-dimensional model data and the attribute information is superimposed and displayed on a screen with a color different from a color of said object.

19. The information presenting system according to claim 16, wherein at least one of said three-dimensional model data and the attribute information is superimposed and displayed on a screen with a color different from a color of said object.

20. The information presenting system according to claim 16, wherein display of said attribute information includes display of a name of the object and a code for indicating said object from the name display.

21. The information presenting system according to claim 16, further comprising a setting section which sets a display position such that the displays of said attribute information do not interfere with each other.

22. The information presenting system according to claim 15, wherein said three-dimensional model data is displayed in a coated surface in which a background is seen through.

23. The information presenting system according to claim 15, wherein said three-dimensional model data is displayed, even when said object is shielded by a shielding material, and is not displayed in said image.

24. The information presenting system according to claim 15, wherein said marker is a visual marker attached to at least one of the object and the vicinity of the object.

25. The information presenting system according to claim 15, wherein said marker is invisible to human eyes.

26. The information presenting system according to claim 15, wherein said marker utilizes a characteristic portion of the object as a marker.

27. The information presenting system according to claim 15, wherein said marker is projected by a projector.

28. The information presenting system according to claim 16, wherein said attribute information is displayed in a least one of a wall surface and a ceiling surface around the object on the image.

29. A model error detecting system in which three-dimensional model data of an object can be corrected based on an image of the object, said system comprising:

an image input section which inputs the image obtained by capturing said object by a capturing apparatus;

a position/orientation detecting section which obtains a position/orientation relation between said object and said capturing apparatus;

a holding section which holds the model data of said object;

an error detecting section which compares the model data of the object extracted from said holding section with the image of said object based on said position/orientation relation, and detects an actual error from the model data of said object; and a correcting section which corrects the model data of the holding section based on a detection result of said error detecting section.

30. The model error detecting system according to claim 29, wherein said position/orientation detecting section uses an image of a marker which is included in the input image and whose position relation with the object is known to obtain the position/orientation relation between the object and said capturing apparatus.

31. The model error detecting system according to claim 29, further comprising:

a display section which superimposes/displays the model data of the object onto the object on said image; and a designating section which designates a place for comparison/collation on display in said display section, wherein said error detecting section uses the image from a plurality of directions to perform a processing of obtaining an error in a two-dimensional projection coordinate in a visual field direction in the place designated by said designating section, and obtains a three-dimensional error.

32. The model error detecting system according to claim 29, wherein said error detecting section matches a pattern of the image obtained by two-dimensionally projecting the three-dimensional model data of said object with a pattern of the image of the object, and detects the error.

33. The model error detecting system according to claim 29, wherein the model data of the object is an image of a previously captured object, or is prepared based on the image.

34. The model error detecting system according to claim 29, wherein said holding section also holds position coordinate data of the object, and
  said error detecting section uses a position coordinate of said object to obtain an error of the position coordinate data from a value obtained by actually measuring a distance between the object and the capturing apparatus by a measuring device.

35. The model error detecting system according to claim 34, wherein said holding section also holds volume data of the object, and
  said error detecting section obtains the image of the object, a volume obtained by using said actually measured distance between the object and the capturing apparatus, and an error of volume data of said holding section.

36. An information presenting system comprising:
  image input means for inputting an image obtained by capturing a marker whose three-dimensional position relation with an object is known by a capturing apparatus;
  position/orientation detecting means for using a position of the marker on said image to obtain a position/orientation relation between said object and said capturing apparatus; and display means for displaying three-dimensional model data of said object on said image with a position, a size, and a direction based on said position/orientation relation.

37. A model error detecting system in which three dimensional model data of an object can be corrected based on an image of the object, said system comprising:
  image input means for inputting an image obtained by capturing said object by a capturing apparatus;
  position/orientation detecting means for obtaining a position/orientation relation between said object and said capturing apparatus;
  holding means for holding the model data of said object;
  error detecting means for comparing the model data of the object extracted from said holding means with the image of said object based on said position/orientation relation, and detecting an actual error with the model data of said object; and
  correcting means for correcting the model data of the holding means based on a detection result of said error detecting means.

38. A three-dimensional position/orientation sensing apparatus for measuring a relative three-dimensional position/orientation relation between an object and a capturing apparatus from an image captured by the capturing apparatus, said sensing apparatus comprising:
  an image input section which inputs the image obtained by capturing said object and at least one marker having a known geometric characteristic and a known three-dimensional position/orientation relation with respect to said object, by using said capturing apparatus;
  an identifying section which uses the geometric characteristic of said at least one marker to identify said at least one marker in the image inputted from said image input section;
  a position/orientation detecting section by a single marker, which analyzes the image of one of said at least one marker identified by said identifying section, obtains a relative position/orientation relation between said one marker and said capturing apparatus, and obtains the three-dimensional position/orientation relation between said object and said capturing apparatus;
  a position/orientation detecting section by a plurality of markers, which analyzes images of plural markers identified by said identifying section to obtain three-dimensional position/orientation relations between said one marker, said object and said capturing apparatus; and
  a changing section which effects selective switching between said position/orientation detecting section by the single marker and said position/orientation detecting section by the plurality of markers.

39. The three-dimensional position/orientation sensing apparatus according to claim 38, wherein said changing section effects switching between said position/orientation detecting section by the single marker and said position/orientation detecting section by the plurality of markers based on a visual field angle of the marker on the image.

40. The three-dimensional position/orientation sensing apparatus according to claim 38, wherein said position/orientation detecting section by the single marker detects a plurality of characteristic portions from the image of said marker, compares a position relation of each of said characteristic portions on the image with a position relation of said each characteristic portion on an actual marker, and obtains the relative position/orientation relation between said marker and said capturing apparatus.

41. The three-dimensional position/orientation sensing apparatus according to claim 40, wherein said marker is formed in a shape of a polygon having four or more sides, and said position/orientation detecting section by the single marker detects a vertex of the polygon as said characteristic portion.

42. The three-dimensional position/orientation sensing apparatus according to claim 38, wherein said position/orientation detecting section by the plurality of markers detects relative position/orientation relations between the capturing apparatus and the plurality of markers based on positions of the plurality of markers on the image.

43. A three-dimensional position/orientation sensing apparatus for measuring a relative three-dimensional position/orientation relation between an object and a capturing apparatus from an image captured by the capturing apparatus, said sensing apparatus comprising:
  image input means for inputting the image obtained by capturing said object and at least one marker having a known geometric characteristic and a known three-dimensional position/orientation relation with respect to said object, by using said capturing apparatus;
  identifying means for identifying said at least one marker in the image inputted from said image input means, by using the geometric characteristic of said at least one marker;
  position/orientation detecting means by a single marker, for analyzing the image of one of said at least one marker identified by said identifying means, obtaining a relative position/orientation relation between said one marker and said capturing apparatus, and obtaining the three-dimensional position/orientation relation between said object and said capturing apparatus;
  position/orientation detecting means by a plurality of markers, for analyzing images of plural markers identified by said identifying means to obtain three-dimensional position/orientation relations between said one marker, said object and said capturing apparatus; and
  changing means for effecting selective switching between said position/orientation detecting means by the single marker and said position/orientation detecting means by the plurality of markers.

44. A three-dimensional position/orientation sensing apparatus for measuring a relative three-dimensional position/orientation relation between an object and a capturing apparatus from an image captured by the capturing apparatus, said sensing apparatus comprising:

an image input section which inputs the image obtained by capturing said object and one or more markers each having a known geometric characteristic and a known three-dimensional position/orientation relation with respect to said object, by using said capturing apparatus;

an identifying section which uses the geometric characteristic of said one or more markers to identify said one or more markers in the image inputted from said image input section;

a switching section which changes a number of said one or more markers to be analyzed; and a position/orientation detecting section which analyzes the image or images of said one or more markers identified by said identifying section in the number set by said switching section, obtains relative position/orientation relations between said capturing apparatus and said one or more markers whose images are analyzed, and obtains the three-dimensional position/orientation relation between said object and said capturing apparatus.

45. A three-dimensional position/orientation sensing apparatus for measuring a relative three-dimensional position/orientation relation between an object and a capturing apparatus from an image captured by the capturing apparatus, said sensing apparatus comprising:

image input means for inputting the image obtained by capturing said object and one or more markers each having a known geometric characteristic and a known three-dimensional position/orientation relation with respect to said object, by using said capturing apparatus;

identifying means for identifying said one or more markers in the image inputted from said image input means by using the geometric characteristic of said one or more markers;

switching means for changing a number of said one or more markers to be analyzed; and position/orientation detecting means for analyzing the image or images of said one or more makers identified by said identifying means in the number set by said switching means, obtaining relative position/orientation relations between said capturing apparatus and said one or more markers whose images are analyzed, and obtaining the three-dimensional position/orientation relation between said object and said capturing apparatus.

\* \* \* \* \*